[12] United States Patent
Murao et al.

(10) Patent No.: US 11,488,159 B1
(45) Date of Patent: Nov. 1, 2022

(54) REVENUE SHARE DETERMINATION FOR TRANSACTIONS ON MAAS PLATFORM WITH COMMON DATABASE ARCHITECTURE

(71) Applicant: SONY GROUP CORPORATION, Tokyo (JP)

(72) Inventors: Sadayoshi Murao, Bangalore (IN); Takashi Togame, Bangalore (IN); Srinivas Pingili, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/486,148

(22) Filed: Sep. 27, 2021

(51) Int. Cl.
*G06Q 20/38* (2012.01)
*G06Q 50/30* (2012.01)
*G06Q 30/02* (2012.01)
*G06F 16/27* (2019.01)
*G06Q 30/00* (2012.01)
*G06N 5/02* (2006.01)

(52) U.S. Cl.
CPC .......... *G06Q 20/389* (2013.01); *G06F 16/27* (2019.01); *G06Q 30/018* (2013.01); *G06Q 30/0215* (2013.01); *G06Q 30/0283* (2013.01); *G06Q 50/30* (2013.01); *G06N 5/02* (2013.01)

(58) Field of Classification Search
CPC ............... G06Q 20/389; G06Q 30/018; G06Q 30/0215; G06Q 30/0283; G06Q 50/30; G06F 16/27; G06N 5/02
USPC ...................................................... 705/14.17
See application file for complete search history.

(56) References Cited

U.S. PATENT DOCUMENTS 10,298,405 B2   5/2019  Ramathal et al.

FOREIGN PATENT DOCUMENTS

| CN | 111625604 A | 9/2020 | |
| CN | 114286997 A * | 4/2022 | ......... G06F 16/2365 |
| WO | 2020/094713 A1 | 5/2020 | |

OTHER PUBLICATIONS

Magnus Sellstedt, Mobility-as-a-Service (MaaS) from a Transport Operator's Perspective, 2019 (Year: 2019).*

* cited by examiner

*Primary Examiner* — Tarek Elchanti
(74) *Attorney, Agent, or Firm* — Chip Law Group

(57) ABSTRACT

A system for determination of a revenue share of a mobility player (MP) of a MaaS network is disclosed. An MP node of the MP is on-boarded to a node package of the MaaS network and gets associated with a MaaS node of the node package, based on an on-boarding process. The on-boarding process includes a definition of a service structure including configuration data of the MP and a signing off of the MP node to a service agreement and a privacy policy associated with the MaaS network based on terms of service of the service agreement. Once, the MP node is on-boarded to the node package, the MaaS node and/or one or more external nodes, such as, a plurality of aggregator nodes and a central MaaS node may determine a revenue share of the MP based on receipt of a trigger event associated with the node package.

22 Claims, 10 Drawing Sheets

REVENUE SHARE DETERMINATION FOR TRANSACTIONS ON MAAS PLATFORM WITH COMMON DATABASE ARCHITECTURE

CROSS-REFERENCE TO RELATED APPLICATIONS/INCORPORATION BY REFERENCE

This Application makes reference to U.S. patent application Ser. No. 17/178,185 filed on Feb. 17, 2021.

The above reference application is hereby incorporated herein by reference in its entirety.

FIELD

Various embodiments of the disclosure relate to mobility-as-a-service (MaaS) and distributed ledger technology. More specifically, various embodiments of the disclosure relate to a system and method for revenue share determination for transactions on a MaaS platform with a Blockchain common database architecture.

BACKGROUND

In a Mobility-as-a-Service (MaaS) platform, multiple mobility providers may provide their services through infrastructures, which may be based on a closed platform. Each of such mobility provider may have a separate ticket processing infrastructure (e.g., ticketing gates and Point-of-Sale (PoS) devices) or a separate application (e.g., a ticket booking application, ticket processing application, and a ride hailing application) to create, pay for, or manage a trip.

On such MaaS platform, transaction messages may be communicated between various nodes of the MaaS platform when a passenger books a ticket for a trip, boards a vehicle of a mobility provider, or de-boards the vehicle of the mobility provider on the trip. The transaction messages associated with the trip may be stored as a transaction record on one or more database nodes (e.g., nodes of a distributed ledger system) associated with the MaaS platform. Each trip may involve provision of a transportation service by multiple mobility providers, which may span multiple geographic regions. Thus, a standardization for settlement of multi-company, cross-country, or cross-region transactions may be required. However, the mobility providers may operate locally or in silos, and such a standardized transaction settlement may be difficult. The standardized transaction settlement may further require data ownership and data access agreements between the mobility providers and the MaaS platform. Such agreements may be non-trivial to generate and may take a long time to be consummated. In certain scenarios, the transactions may be settled (for example for auditing, accounting, or other management operations of the mobility providers) based on analysis of the transaction records on nodes of a distributed ledger system associated with the MaaS platform. However, the analysis of the transaction records on the nodes of the distributed ledger system associated with the MaaS platform may be a cumbersome and a slow process.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for revenue share determination for transactions on a mobility-as-a-service (MaaS) platform with a common database architecture is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
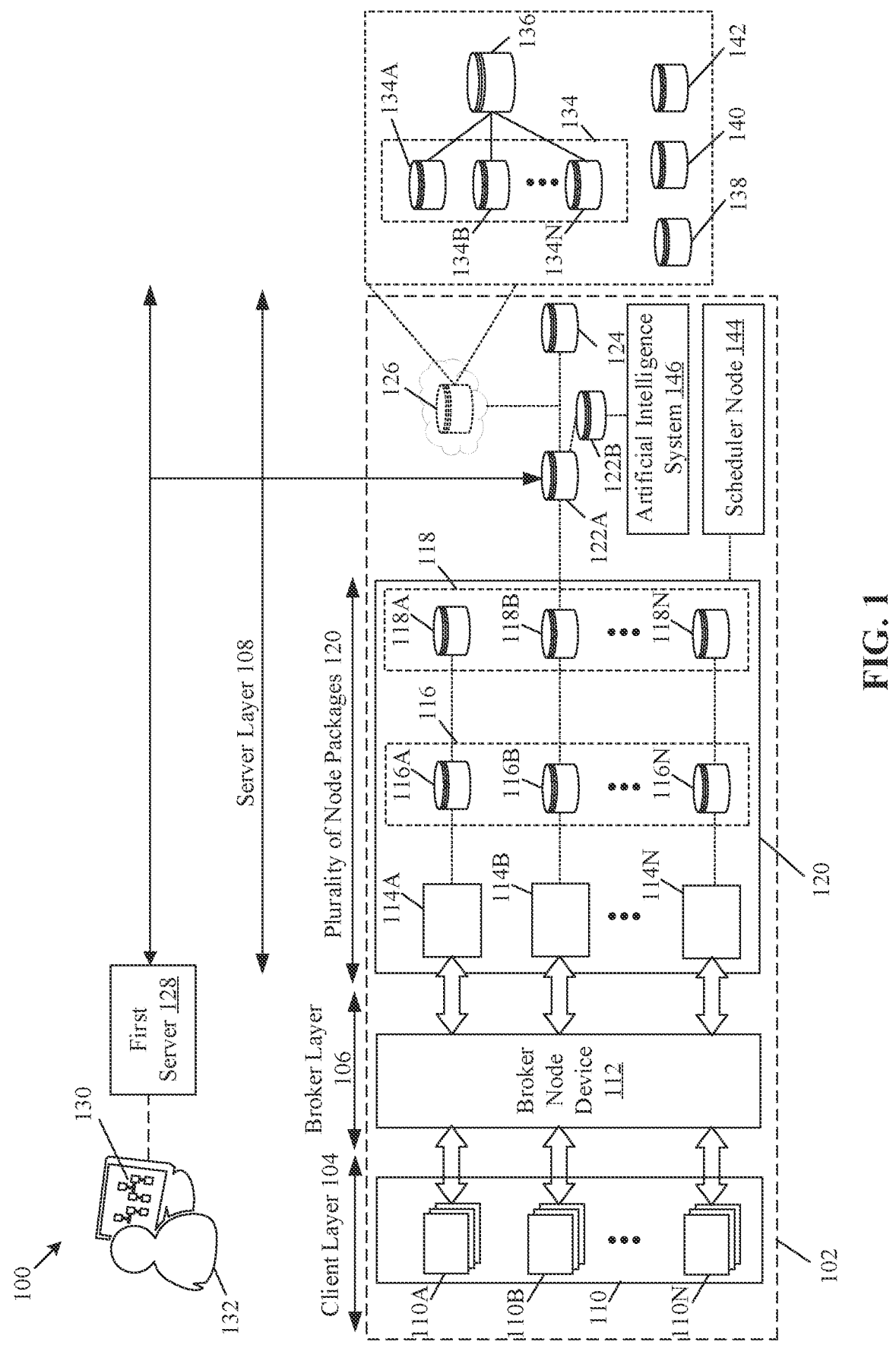
FIG. 1 is a diagram of an exemplary network environment for revenue share determination for transactions on a mobility-as-a-service (MaaS) platform with a common database architecture, in accordance with an embodiment of the disclosure.

The following described implementations may be found in the disclosed system and method for revenue share determination for transactions on a mobility-as-a-service (MaaS) network (interchangeably referred hereinafter as a MaaS platform) with a common database architecture. The disclosed system may be a part of a federated transportation management system that may facilitate multiple homogeneous or heterogenous mobility providers and their infrastructure, such as ticketing gates, applications, and/or Point of Sale (PoS) devices to operate on the MaaS network to provide various mobility services. Each mobility provider may have secure data ownership and may control co-use of relevant transaction records through a distributed ledger. This may enhance connectivity between the various mobility providers. The system may further enhance handling of revenue sharing models, roaming management, and contract management between the different mobility providers, based on the controlled co-use of the relevant transaction records through the distributed ledger. Each mobility provider in the MaaS network may be associated with the MaaS network through a service agreement with certain terms or service and a related privacy policy. Before a node of a mobility provider joins the MaaS network, the mobility provider node may be on-boarded to the MaaS network, based on the service agreement, terms of service, and the privacy policy. On acceptance of the service agreement and based on the terms of service and the privacy policy, the node of the mobility provider may be on-boarded and admitted to the MaaS network.

Exemplary aspects of the disclosure provide a system that may include a plurality of node packages associated with a MaaS network. Each of the plurality of node packages may include a subscriber node, a mobility provider (MP) node of a first distributed ledger and a MaaS node of a second distributed ledger. The MaaS network may further include a plurality of publisher nodes and a broker node device. One or more nodes associated with the MaaS network may be configured to handle a plurality of transaction records associated with a trip plan of a sequence of trip plans included in a MaaS mobility service. The transaction records may further be associated with a travelling user (such as a roaming user). The plurality of transaction records may be associated with information, such as, ticketing information, subscription information, payment information, revenue sharing information, and/or mobility service information. Each of the plurality of transaction records may be associated with a transaction message received by the subscriber node (such as, a first subscriber node) of a first node package of the plurality of node packages. The transaction message may be received by the subscriber node from a publisher node (such as, a first publisher node of the plurality of publisher nodes), via the broker node device.

The disclosed system may further include a plurality of aggregator nodes and a central MaaS node. The plurality of aggregator nodes and the central MaaS node may be communicatively coupled to the plurality of node packages of the MaaS network. A first aggregator node of the plurality of aggregator nodes may be configured to receive a first set of transaction records from a first MaaS node of the first node package of the plurality of node packages, based on a trigger event associated with the first node package. The first set of transaction records may be associated with a first MP node of the first node package. Each of the first set of transaction records may be associated with a transaction message received by the first subscriber node of the first node package.

In an embodiment, the MaaS network may further include a scheduler node communicatively coupled to the plurality of node packages. The trigger event associated with the first node package may be generated by the scheduler node, based on at least one of a pre-determined schedule or a reception of a pre-defined number of transaction records at the first MaaS node. In an embodiment, a first MP (mobility player) corresponding to the first MP node and a first MaaS player corresponding to the first MaaS node are associated with the MaaS network based on a service agreement, a revenue sharing model, a data ownership agreement, a terms of service agreement, a privacy policy, and/or a policy amendment associated with a region of operation of at least one of the first MP or the first MaaS player.

The first aggregator node may be further configured to determine a first summary record associated with the first MP node, based at least on an aggregation of a transaction amount associated with each of the received first set of transaction records. In an embodiment, the determination of the first summary record associated with the first MP node may be further based on a first set of parameters. The first set of parameters may include company information associated with the first MP, service item information associated with each of the first set of transaction records, ticket sales data associated with each of the first set of transaction records, fare price master data associated with the first MP, service price master data associated with the first MP, and/or ticket transaction data associated with each of the first set of transaction records. In an embodiment, the determination of the first summary record may be further based on an application of at least one of a Big Data platform, a Hadoop platform, or a MapReduce platform on at least one of the transaction amount associated with each of the received first set of transaction records or the first set of parameters.

The first aggregator node may be further configured to transmit the determined first summary record to the central MaaS node. The central MaaS node may be configured to receive a set of summary records associated with the first MP node from the plurality of aggregator nodes. The received summary of records may include at least the first summary record. The central MaaS node may be further configured to determine a second summary record associated with the first MP node, based on an aggregation of a transaction amount associated with each of the received set of summary records. The central MaaS node may be further configured to determine a first revenue share associated with the first MP corresponding to the first MP node based on the determined second summary record. The central MaaS node may be further configured to transmit the determined first revenue share associated with the first MP to the first MaaS node.

In an embodiment, the determination of the first revenue share associated with the first MP may be further based on a second set of parameters. The second set of parameters may include a fee associated with a first MaaS player corresponding to the first MaaS node, a carbon footprint associated with the first MP, a green energy incentive earned by the first MP, a traffic jam mitigation achieved by the first MP, and/or a fare slab related to rides associated with the first MP. In an embodiment, the determination of the first revenue share associated with the first MP may be further based on an application of an Artificial Intelligence (AI)

system on at least one of the determined second summary record or the second set of parameters.

In contrast to conventional systems that may analyze transaction records of mobility providers on the distributed ledger nodes associated with the MaaS network, the disclosed system offloads the analysis of the transaction records to an external system that may include the plurality of aggregator nodes and the central MaaS node. For example, the first set of transaction records may include a large number of transactions records of the first MP node, such as, a few million transactions records, that may be generated over a period of a month. In such case, the analysis of the first set of transaction records on the distributed ledger nodes may be cumbersome and may consume a significant amount of time. When the analysis of such large number of transaction records is offloaded to the disclosed system (including the external system), each of the aggregator nodes may roll-up transaction records of the first MP node received from respective node packages associated with the aggregator node. For example, the first aggregator node may roll-up the first set of transaction records of the first MP node, associated with the first node package, to determine the first summary record associated with the first MP node. Other aggregator nodes of the plurality of aggregator nodes may similarly roll-up transaction records of the first MP node, associated with the other respective node packages, to determine a corresponding summary record associated with the first MP node for the corresponding node package. For example, a second aggregator node of the plurality of aggregator nodes may determine a summary record for the first MP node, associated with a second node package, based on a second set of transaction records of the first MP node associated with the second node package. The determination of such summary records at the various aggregator nodes may be executed in a parallel manner. For example, a Big Data platform may be leveraged at the various aggregator nodes to parallelize the determination of summary records associated with the first MP nodes. The parallelization of the determination of the summary records may increase an efficiency, reduce cost, and reduce time involved in the analysis of the large amount of transaction records. The central MaaS node may receive summary records determined by the plurality of aggregator nodes as the set of summary records associated with the first MP node. The central MaaS node may further collate the set of summary records to determine the second summary record. The central MaaS node may apply one or more rules and/or the AI system on the determined summary record to intelligently determine the first revenue share associated with the first MP or with other MPs associated with the first MaaS player. Thus, for a large set of transaction records, the offloaded revenue share calculation on the disclosed system (that may be external to the distributed ledger nodes) may be more efficient and may consume less time and less resources, in comparison to a calculation of the revenue share within the MaaS platform, for example, on nodes of a distributed ledger (such as, the MP nodes and the MaaS nodes).

FIG. 1 is a diagram of an exemplary network environment for revenue share determination for transactions on a mobility-as-a-service (MaaS) platform with a common database architecture, in accordance with an embodiment of the disclosure. With reference to FIG. 1, there is shown a block diagram of a network environment 100. The network environment 100 may include a first MaaS network 102, which may be associated with a publish-subscribe pattern. The first MaaS network 102 may include a first plurality of nodes, which may be configured in layers, such as a client layer 104, a broker layer 106, and a server layer 108. The first plurality of nodes may include a plurality of publisher nodes 110 in the client layer 104; and a broker node device 112 in the broker layer 106. The first plurality of nodes may further include a first plurality of subscriber nodes 114A, 114B, . . . , and 114N, a plurality of mobility-provider (MP) nodes 116A, 116B, . . . and 116N of a first distributed ledger, a plurality of MaaS nodes 118A, 118B, . . . and 118N of a second distributed ledger, an analytics node 122A, a monitor node 122B, an archival database node 124, and a cache database node 126 (hereinafter also referred as a system 126) in the server layer 108. The first plurality of subscriber nodes 114A, 114B, . . . and 114N, the plurality of MP nodes 116A, 116B, . . . and 116N, and the plurality of MaaS nodes 118A, 118B, . . . and 118N may collectively form a plurality of node packages 120 of the first MaaS network 102. For example, a first node package of the plurality of node packages 120 may include a first subscriber node 114A, a first MP node 116A, and a first MaaS node 118A. In another example, a second node package of the plurality of node packages 120 may include a second subscriber node 114B, a second MP node 116B, and a second MaaS node 118B. The analytics node 122A may be communicatively coupled to the plurality of node packages 120. The archival database node 124 may be communicatively coupled to the analytics node 122A. The plurality of publisher nodes 110 in the client layer 104 may be configured to communicate with the first plurality of subscriber nodes 114A, 114B, . . . and 114N through the broker node device 112. In some embodiments, the network environment 100 may include more than one broker node device 112. In another embodiment, the network environment 100 may include an intelligent broker node that may include a functionality of one or more broker node devices.

The plurality of publisher nodes 110 may include a first publisher node 110A, a second publisher node 110B, . . . and an Nth publisher node 110N. The first plurality of subscriber nodes 114A, 114B, . . . and 114N may include a first subscriber node 114A, a second subscriber node 114B, . . . and an Nth subscriber node 114N. In an embodiment, each of the first plurality of subscriber nodes 114A, 114B, . . . and 114N may be interfaced with the broker node device 112 through a plug-in for communication of data (e.g., transaction messages). Each of the first plurality of subscriber nodes 114A, 114B, . . . 114N may be associated with a respective MP node and MaaS node. For example, the first subscriber node 114A may be associated with each of a first MP node 116A and a first MaaS node 118A. Further, the second subscriber node 114B may be associated with each of a second MP node 116B and a second MaaS node 118B. Similarly, the Nth subscriber node 114N may be associated with each of an Nth MP node 116N and an Nth MaaS node 118N.

The network environment 100 may further include a first server 128, an administrator device 130, which may be operated by an administrator 132 of the first MaaS network 102. The administrator device 130 may be used by the administrator 132 to access the first server 128 and execute one or more operations on the first server 128. In the network environment 100, there may further be a user (not shown) who may interact with the plurality of publisher nodes 110 to avail mobility services from different mobility providers of the first MaaS network 102. The system 126 may include a plurality of aggregator nodes 134 and a central MaaS node 136, wherein the plurality of aggregator nodes 134 may be communicatively coupled to the central MaaS node 136. The plurality of aggregator nodes 134 may include a first aggregator node 134A, a second aggregator node 134B, . . . and an Nth aggregator node 134N. The system 126 including the plurality of aggregator nodes 134 and the central MaaS node 136 may be communicatively coupled to the plurality of node packages 120. The system 126 may further include a configuration database 138, a consumer database 140, and a transaction database 142. The network environment 100 may further include a scheduler node 144 and an Artificial Intelligence (AI) system 146. In an embodiment, the scheduler node 144 may be communicatively coupled to the plurality of node packages 120. Further, the AI system 146 may be communicatively coupled to the monitor node 1228. The AI system 146 may be further communicatively coupled to the system 126. In another embodiment, both the scheduler node 144 and the AI system 146 may be communicatively coupled to the plurality of node packages 120.

The first MaaS network 102 may include a network of nodes, such as, the first plurality of nodes which may be configured to operate in the client layer 104, the broker layer 106, and the server layer 108. The first MaaS network 102 may handle transactions (such as, the transaction messages) for a MaaS mobility service associated with multiple mobility providers. Each of such mobility providers may own, lease, or manage a cluster of nodes in each of the client layer 104 and the server layer 108 of the first MaaS network 102. For example, the first publisher node 110A, the first subscriber node 114A, and the first MP node 116A may be associated with a first mobility provider. The second publisher node 110B, the second subscriber node 114B, and the first MP node 116A may be associated with a second mobility provider which may be different from the first mobility provider.

In some embodiments, the first MaaS network 102 may support an open standard specification for MaaS. In such a case, the plurality of publisher nodes 110 (e.g., ticket readers or sensor devices) of different companies associated with various mobility providers of the first MaaS network 102 may join the first MaaS network 102 as homogeneous publisher nodes. Additionally, legacy ticket readers or sensor devices may connect to the first MaaS network 102 based on leverage of standard communication protocols, such as, a Message Queuing Telemetry Transport (MQTT)-based messaging protocol, an Advanced Message Queuing Protocol (AMQP)-based messaging protocol, or a Message-Oriented Middleware (MOM)-based messaging framework. The first MaaS network 102 may utilize standard communication protocols to provide ticket roaming functionality to the users. For example, a ticket reader of any mobility provider may scan an electronic ticket of a user for a MaaS mobility service and may provide the respective mobility service of the mobility provider to the user (irrespective of the issuer of the ticket) based on seamless and secure access of the first MaaS network 102.

In accordance with an embodiment, each of the plurality of MP nodes 116A, 116B, . . . 116N may be associated with a separate mobility provider of the first MaaS network 102. The MaaS mobility service may be provided by homogeneous mobility providers (such as multiple cab ride provider companies or multiple rail companies) or heterogenous mobility providers through a homogenous group of devices, applications, or ticketing gates, or a heterogenous group of ticketing gates, applications, and Point of Sale (PoS) devices. The MaaS mobility service may be a combination of individual service offerings of one or more homogenous or heterogeneous mobility providers. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

Each of the plurality of publisher nodes 110A, 110B, . . . 110N may include a suitable logic, circuitry, code, and/or interface that may be configured to operate as a ticket processing client for a mobility service of a respective mobility provider. For example, as a ticket processing client, each of the first publisher node 110A, the second publisher node 110B, . . . and the Nth publisher node 110N may read, issue, recharge, or cancel tickets to create events associated with a respective mobility service. Based on such events, transaction messages may be generated by each of the first publisher node 110A, the second publisher node 110B, . . . and the Nth publisher node 110N and the generated transaction messages may be communicated to one or more subscriber nodes of the first MaaS network 102 or other MaaS networks, through the broker node device 112. Examples of a publisher node may include a consumer electronic device with a trip planning or booking application, a ticket reader on a ticketing gate, a ticketing kiosk a Point-of-Sale (PoS) device, a mobile POS, a ticket vending machine, and/or a smart door of a transport vehicle which may read a ticket to start or end a ride.

The broker node device 112 may include suitable logic, circuitry, code, and/or interfaces that may be configured to route transaction messages from a publisher node (such as, the first publisher node 110A) to a suitable node, such as a subscriber node (such as, the first subscriber node 114A). The broker node device 112 may be configured to communicate with each of the plurality of publisher nodes 110A, 1048, . . . 104N and each of a first plurality of subscriber nodes 114A, 114B, . . . 114N through a suitable publish-subscribe network protocol, for example, a Message Queuing Telemetry Transport (MQTT)-based messaging protocol, an Advanced Message Queuing Protocol (AMQP)-based messaging protocol, or a Message-Oriented Middleware (MOM)-based messaging framework. Example implementations of the broker node device 112 may include an application server, a cloud server, a mainframe server, a database server, a web server, or other type of servers.

Each of the first plurality of subscriber nodes 114A, 114B, . . . 114N may include suitable logic, circuitry, code, and/or interfaces that may be configured to receive the transaction messages through the broker node device 112 from one or more of the plurality of publisher nodes 110A, 110B, . . . 110N. In an embodiment, each of the first plurality of subscriber nodes 114A, 1148, . . . 114N may be interfaced with the broker node device 112 through a plug-in for communication of data (e.g., transaction messages). Each transaction message may include a topic which may be subscribed by one or more subscriber nodes of the first plurality of subscriber nodes 114A, 114B, . . . 114N. Example implementations of a subscriber node may include a web server, an edge device, an edge node, a cloud server, a cluster of cloud-based servers, a workstation, and/or any computing device with a fog or cloud computing capability.

Each of MP nodes 116A, 116B, . . . 116N may include suitable logic, circuitry, code, and/or interfaces that may be configured to store transaction records associated with a respective mobility provider. For example, the first MP node 116A may store transaction records associated with a first mobility provider. In an embodiment, each transaction records stored on each MP node may be associated with a two-party transaction. For example, the transaction records stored on an MP node of a certain mobility provider may be associated with transactions that may involve the mobility provider and a MaaS provider. The transaction records may include records of trips of users. Each trip may correspond to a mobility service that may be provided by the first mobility provider in at least one way of the journey. Each of the MP nodes 116A, 116B, . . . 116N may be referred to as nodes of a distributed ledger 116 (such as the first distributed ledger) that may store transaction records of the various mobility providers of the first MaaS network 102. In an embodiment, each MP node may be implemented as, for example, one of an edge device, an edge node, or a distributed ledger node with a fog or cloud computing capability.

Each of the MaaS nodes 118A, 118B, . . . 118N may include suitable logic, circuitry, code, and/or interfaces that may be configured to store the transaction records associated with all mobility providers of the first MaaS network 102. The storage of the transaction records associated with each of the mobility providers may be used to settle transactions of trips amongst the mobility providers that offer mobility services to users. In an embodiment, each transaction records stored on each MaaS node may be associated with a multi-party transaction. For example, the transaction records stored on a MaaS node may be associated with transactions that may involve one or more mobility providers of the first MaaS network 102 and the MaaS provider. In such case, the MP node and the MaaS node may store same transaction. Each of the MaaS nodes 118A, 1188, . . . 118N may correspond to nodes of a distributed ledger 118 (such as the second distributed ledger) that may store transaction records associated with the first MaaS network 102. In an embodiment, each MaaS node may be implemented as one of, but is not limited to, an edge device, an edge node, or a distributed ledger node with a fog or cloud computing capability.

In an embodiment, one or more of the plurality of node packages 120 may include a subscriber node, a one or more of MP nodes of the first distributed ledger, and a MaaS node of the second distributed ledger. For example, the first node package of the plurality of node packages 120 may include the first subscriber node 114A, the first MP node 116A, and the first MaaS node 118A. In another example, the second node package may include, the second subscriber node 114B, the second MP node 116B, and the second MaaS node 1188. In certain cases, MP nodes associated with different node packages may be associated with separate mobility providers of the first MaaS network 102. In an example, the first MP node 116A may be associated with the first mobility provider (e.g., a taxi service provider) and the second MP node 116B may be associated with the second mobility provider (e.g., a metro rail service provider). In other cases, an MP node (e.g., the first MP node 116A) of one node package (e.g., the first node package 120A) and an MP node (e.g., the second MP node 116B) of another node package (e.g., the second node package 1208) may be associated with the same mobility provider. In some embodiments, each node package of the plurality of node packages 120 may be connected to the client layer 104, through the broker layer 106, via a plug-in interface.

In an embodiment, at least two nodes of each of the distributed ledger 116 and/or the distributed ledger 118 may store the transaction records associated with a MaaS mobility service. The transaction records associated with the MaaS mobility service may be included in a set of state objects, such as an initial state object and an updated version of the initial state object. Each state object may include a smart contract, a contract code (or rules of a transaction upon which parties to the transaction agree), and state properties (that may be updated when the transaction records is updated based on transaction messages from the publisher node). By way of example, and not limitation, each of the distributed ledger 116 and the distributed ledger 118 may be a Corda blockchain, an Ethereum blockchain, or a Hyperledger blockchain. For example, U.S. patent application Ser. No. 17/178,185 filed on Feb. 17, 2021, discloses details related to the distributed ledger 116 and the distributed ledger 118.

In an embodiment, each of the first MP node 116A and the first MaaS node 118A may be configured to receive a transaction message via the first subscriber node 114A. Each of the first MP node 116A and the first MaaS node 118A may update an initial state object associated with each of the distributed ledger 116 and the distributed ledger 118, respectively, based on the transaction message to output an updated state object. Each of the first MP node 116A and the first MaaS node 118A may build a transaction that may include the initial state object with initial transaction data and the updated state object with updated transaction data.

The analytics node 122A may include suitable logic, circuitry, code, and/or interfaces that may be configured to store a first group of transaction records of a first plurality of transaction records associated with all the mobility providers of the first MaaS network 102. The storage of the first group of transaction records in the analytics node 122A may be based on a first data retention threshold and a first storage duration of the first plurality of transaction records on the first MaaS node 118A. For example, if the first data retention threshold is three days, all transaction records of the first plurality of transaction records, that have a storage duration (i.e., first storage duration) of three or more days at the first MaaS node 118A, may be selected as the first group of transaction records at the first MaaS node 118A. The analytics node 122A may receive the selected first group of transaction records from the first MaaS node 118A for storage at the analytics node 122A. In an embodiment, the analytics node 122A may be configured to store selected transaction records from the first group of transaction records, based on an aggregation logic. In an embodiment, the analytics node 122A may receive, from the first server 128, one or more queries associated with the first group of transaction records stored on the analytics node 122A. Based on the received one or more queries, the analytics node 122A may transmit one or more transaction records of the first group of transaction records to the first server 128. Further, the analytics node 122A may store frequently queried transaction records of the analytics node 122A on the cache database node 126. In accordance with an embodiment, the analytics node 122A may be a node of a distributed ledger (e.g., the distributed ledger 118) related to the first MaaS network 102 that may store the first group of transaction records associated with the mobility providers of the first MaaS network 102. In accordance with another embodiment, the analytics node 122A may be a non-distributed ledger (or a local) node.

The monitor node 122B may include suitable logic, circuitry, code, and/or interfaces that may be configured to periodically monitor a set of impact factors associated with each mobility provider of the first MaaS network 102. For example, the set of impact factors may be monitored at an end of each day (such as, at 11:59:59 PM). The set of impact factors associated with a mobility provider may be used to determine incentives or penalties that may be applicable on a revenue share of the mobility provider. Examples of the set of impact factors are provided, for example, in FIG. 2 (at 216). The set of impact factors may be determined based on the configuration data associated with the mobility provider, which may be stored in the configuration database 138. The monitor node 1228 may transmit the monitored set of impact factors of the mobility provider to the central MaaS node 136 for the determination of a revenue share associated with the mobility provider based on the monitored set of impact factors. Examples of the monitor node 1228 may include, but are not limited to, an Internet-of-Things (IoT)-based computing device, a smartphone, a cellular phone, a mobile phone, or a consumer electronic (CE) installed on/used in vehicles of the mobility provider. Further examples of the monitor node 122B may include, but are not limited to, edge nodes, edge devices, or fog or cloud computing capable devices, which may communicate with an electronic device installed on/used in the vehicles of the mobility provider.

The archival database node 124 may include suitable logic, circuitry, code, and/or interfaces that may be configured to store a second group of transaction records associated with all the mobility providers of the first MaaS network 102. The storage of the second group of transaction records in the archival database node 124 may be based on a second data retention threshold and a second storage duration of a third group of transaction records stored on the analytics node 122A. The third group of transaction records may include at least the first group of transaction records that may be stored on the analytics node 122A. For example, the second data retention threshold may be sixty days. In this case, the first MaaS node 118A may control the analytics node 122A to select all the transaction records from the third group of transaction records stored on the analytics node 122A that have a storage duration (i.e., the second storage duration) of sixty days or more, as the second group of transaction records. Herein, the third set of transaction records may at least include the first group of transaction records received from the first MaaS node 118A. The third group of transaction records may further include other transaction records, which may be older or newer than the first group of transaction records. The first MaaS node 118A may further control a transmission of the selected second group of transaction records to the archival database node 124 for storage at the archival database node 124. In accordance with an embodiment, the archival database node 124 may be a node of a distributed ledger (e.g., the distributed ledger 118) related to the first MaaS network 102 that may store the second set of transaction records associated with the mobility providers of the first MaaS network 102. In accordance with another embodiment, the archival database node 124 may be a non-distributed ledger (or a local) node without querying mechanism. A non-distributed ledger based node may be cost effective and faster than a distributed ledger based node.

The cache database node 126 may include suitable logic, circuitry, code, and/or interfaces that may be configured to aggregate transaction records of the various MP nodes and determine revenue shares associated with the various mobility providers associated with the first MaaS network 102, based on the aggregated transaction records. The cache database node 126, which is hereinafter also referred as the system 126, may be communicatively coupled to the plurality of node packages 120. In an embodiment, the cache database node 126 may also be configured to store frequently queried transaction records of the analytics node 122A in a fast-temporary memory or database (for example, the transaction database 142). The cache database node 126 may enable reduction in workload of other database nodes, such as the plurality of MP nodes 116A, 116B, . . . 116N, the plurality of MaaS nodes 118A, 118B, . . . 118N, the analytics node 122A, and the archival database node 124. For example, in case a number of transaction records associated with the first MP node 116A in a certain time period is greater than a certain threshold (for example, a million transaction records), the first MaaS node 118A may offload processing or analysis of such large number of transaction records associated with the first MP node 116A to the cache database node 126. By way of an example, and not limitation, a calculation of a revenue share of a mobility provider corresponding to the first MP may be offloaded to the cache database node 126, in the case of such large number of transaction records of the first MP node 116A.

In an embodiment, the system 126 (i.e., the cache database node 126) may be internal to the first MaaS network 102 (as shown in FIG. 1). Alternatively, the system 126 may be external to the first MaaS network 102. In some embodiments, the system 126 may be omitted (or not used, if present) in the network environment 100 and the functionalities of the system 126 may be performed by one or more database nodes, such as the plurality of MP nodes 116A, 116B, . . . 116N, the plurality of MaaS nodes 118A, 118B, . . . 118N, the analytics node 122A, and the archival database node 124. For example, in case a number of transactions records associated with the first MP node 116A in a certain time period is less than a certain threshold (for example, transaction records in few thousands), the system 126 may be omitted (or may not be used) in the network environment 100. In such case, the one or more distributed ledger or Blockchain nodes (such as, the plurality of MP nodes 116A, 116B, . . . 116N), and other database nodes (such as, the plurality of MaaS nodes 118A, 118B, . . . 118N, the analytics node 122A, and the archival database node 124) of the first MaaS network 102 may efficiently process or analyze such transaction records associated with the first MP node 116A.

Each of the plurality of aggregator nodes 134 may include suitable logic, circuitry, interfaces, and/or code that may be configured to aggregate a transaction amount associated with each of a set of transaction records associated with an MP node (e.g., the first MP node 116A). Based on the aggregation of the transaction amount associated with each of the set of transaction records, the aggregator node (e.g., the first aggregator node 134A) may determine a first summary record associated with the MP node. The determination of the first summary record may be further based on a first set of parameters. In accordance with an embodiment, each of the plurality of aggregator nodes 134 may be a non-distributed ledger (or a local) node. A non-distributed ledger based node may be cost effective and faster than a distributed ledger based node. In an embodiment, to determine the first summary record, each of the plurality of aggregator nodes 134 may be implemented on or apply at least one of, but is not limited to, a Big Data platform, a Hadoop platform, or a MapReduce platform on the set of transaction records and/or the first set of parameters. The plurality of aggregator nodes 134 may be configured to parallelize an aggregation of the set of transaction records of each MP node of the first MaaS network 102. Examples of the plurality of aggregator nodes 134 may include, but are not limited to, a database node, a mainframe machine, a server, a computer workstation, and/or any computing device with an aggregation logic.

The central MaaS node 136 may include suitable logic, circuitry, interfaces, and/or code that may be configured to receive a set of summary records associated with an MP node (for example, the first MP node 116A) from the plurality of aggregator nodes 134. The set of summary records may include at least the first summary record. The central MaaS node 136 may aggregate a transaction amount associated with each of the received set of summary records to determine a second summary record associated with the MP node. Further, based on the determined second summary record, the central MaaS node 136 may determine a revenue share associated with a mobility provider corresponding to the MP node. In accordance with an embodiment, each of the plurality of aggregator nodes 134 may be a non-distributed ledger (or a local) node. A non-distributed ledger based node may be cost effective and faster than a distributed ledger based node. Examples of the central MaaS node 136 may include, but are not limited to, a database node, a mainframe machine, a server, a computer workstation, and/or any computing device with an aggregation logic.

The configuration database 138 (also referred as config. database 138) may include suitable logic, circuitry, interfaces, and/or code that may be configured to store configuration data associated with a mobility provider. The configuration data associated with the mobility provider may include revenue sharing configuration that may be generated based on an on-boarding of an MP node associated with the mobility provider to the first MaaS network 102. The configuration data may be used for determination of a revenue share associated with the mobility provider. For example, the configuration data for the first MP may specify that 10% of the revenue earned by the first MP may be payable as a MaaS fees to the first MaaS player. In an example, the configuration data may include the second set of parameters and/or the set of impact factors associated with a mobility provider. For example, the second set of parameters may include a fee associated with a first MaaS player corresponding to the first MaaS node, a carbon footprint associated with the first MP, a green energy incentive earned by the first MP, a traffic jam mitigation achieved by the first MP, and/or a fare slab related to rides associated with the first MP. Examples of the set of impact factors may include an incubation or innovation of a new mobility mode, an environmental sustainability, a carbon-dioxide impact, a total economic growth, a traffic capacity normalization, and/or health and welfare initiatives. In accordance with an embodiment, the configuration database 138 may be a non-distributed ledger (or a local) node. A non-distributed ledger based node may be cost effective and faster than a distributed ledger based node.

The consumer database 140 may include suitable logic, circuitry, interfaces, and/or code that may be configured to store mobility provider data associated with each mobility provider associated with the first MaaS network 102. For example, the mobility provider data associated with an MP may include data ownership details related to the MP, a service contract between the MP and a MaaS player, terms or service associated with the service contract, a privacy policy associated with the service contract, a process service associated with the service contract, and/or a revenue model associated with the MP and the MaaS player. When a MP node (e.g., the first MP node 116A) is on-boarded on the first MaaS network 102, the MP node may be registered with a certain MaaS node (e.g., the first MaaS node 118A) to create a node package (e.g., the first node package 120A). Further, at this stage, the mobility provider data associated with an MP corresponding to the MP node is generated and stored on the consumer database 140. In accordance with an embodiment, the consumer database 140 may be a non-distributed ledger (or a local) node. A non-distributed ledger based node may be cost effective and faster than a distributed ledger based node.

The transaction database 142 may include suitable logic, circuitry, interfaces, and/or code that may be configured to store transaction records associated with each of the plurality of MP nodes 116A, 116B, . . . 116N received from the plurality of MaaS nodes 118A, 118B, . . . 118N. In an embodiment, the transaction database 142 may also store frequently queried transaction records associated with the analytics node 122A. In a fast-temporary memory or database. In accordance with an embodiment, the transaction database 142 may be a non-distributed ledger (or a local) node. A non-distributed ledger based node may be cost effective and faster than a distributed ledger based node.

The scheduler node 144 may include suitable logic, circuitry, interfaces, and/or code that may be configured to generate a trigger event associated with each of the plurality of node packages 120. In an embodiment, the trigger event associated with a node package (e.g., the first node package 120A) based on at least one of a pre-determined schedule or a reception of a pre-defined number of transaction records at a MaaS node (e.g., the first MaaS node 118A) of the node package. Examples of the scheduler node 144 may include, but are not limited to, a smartphone, a cellular phone, a mobile phone, a mainframe machine, a server, a computer workstation, and/or any computing device with a schedule-based or an event-based triggering mechanism.

The AI system 146 may include suitable logic, circuitry, interfaces, and/or code that may be configured to determine a revenue share associated with a mobility provider associated with the first MaaS network 102 based on the second summary record associated with an MP node of the mobility provider and/or a set of parameters associated with revenue determination. For example, the set of parameters may include a second set of parameters that may be determined from the set of impact factors monitored by the monitor node 122B. In an embodiment, the AI system 146 may be further trained on an environmental impact analysis task. In an embodiment, the environmental impact analysis task may include determination of a score for trends of changes of values of each of the set of impact factors associated with the first MP. Based on the determined score, a future change in the values of the set of impact factors associated with the first MP may be predicted. The AI system 146 may include an AI model (for example, an AI Model 812D of FIG. 8), such as, a regression model, which may be trained to identify a relationship between inputs, such as features in a training dataset and output values, such as a revenue share percentage/ratio for an MP, an absolute revenue value for an MP, or an impact factor score associated with the MP. The AI model may be defined by its hyper-parameters, for example, number of weights, cost function, input size, number of layers, and the like. The hyper-parameters of the AI model may be tuned and weights may be updated so as to move towards a global minima of a cost function for the AI model. After several epochs of the training on the feature information in the training dataset, the AI model may be trained to output a determined revenue share result or an impact factor score for a set of inputs (for example, the second summary record, the second set of parameters, and/or the set of impact factors). The determined output may be indicative of a predicted revenue value for the set of inputs (e.g., input features extracted from new/unseen instances).

The AI model may include electronic data, which may be implemented as, for example, a software component of an application executable on an electronic device associated with the AI system 146. The AI model may rely on libraries, external scripts, or other logic/instructions for execution by a processing circuitry of the electronic device associated with the AI system 146. The AI model may include code and routines configured to enable the electronic device associated with the AI system 146 to perform one or more operations, such as, determination of a revenue share percentage/ratio, or an absolute revenue value for an MP. Additionally, or alternatively, the AI system 146 may be implemented using hardware including a processor, a microprocessor (e.g., to perform or control performance of one or more operations), a field-programmable gate array (FPGA), or an application-specific integrated circuit (ASIC). Alternatively, in some embodiments, the AI system 146 may be implemented using a combination of hardware and software.

The first server 128 may include suitable logic, circuitry, interfaces, and/or code that may be configured to query one or more first transaction records stored on the analytics node 122A and verify one or more transactions associated with the queried one or more first transaction records. The first server 128 may be further configured to query one or more second transaction records stored on the archival database node 124 and control display of statistical information associated with the queried one or more second transaction records. In some embodiments, if the one or more second transaction records are cached by the cache database node 126, the first server 128 may be configured to query one or more third transaction records from the one or more second transaction records stored on the cache database node 126. The first server 128 may control the display of the statistical information associated with the queried one or more third transaction records, in a similar manner.

In accordance with an embodiment, the first server 128 may be configured to process API requests, such as, API requests associated with transaction verification, analytics, or visualization. The API request may be processed based on the one or more first transaction records stored on the analytics node 122A and/or the one or more second transaction records stored on the archival database node 124 (or the cache database node 126). In accordance with an embodiment, the first server 128 may provision API services that may be programmed based on a scripting language, such as, but is not limited to, JavaScript or Python. The first server 128 may be implemented as a cloud server or a cluster of cloud servers that may execute operations through web applications, cloud applications, HTTP requests, repository operations, file transfer, and the like. Other example implementations of the first server 128 may include, but are not limited to, a database server, a file server, a web server, a media server, an application server, a mainframe server, or a cloud computing server.

In at least one embodiment, the first server 128 may be implemented as a plurality of distributed cloud-based resources by use of several technologies that are well known to those ordinarily skilled in the art. A person with ordinary skill in the art will understand that the scope of the disclosure may not be limited to the implementation of the first server 128 and the broker node device 112 as two separate entities. In certain embodiments, the functionalities of the first server 128 can be incorporated in its entirety or at least partially in the broker node device 112, without a departure from the scope of the disclosure.

In accordance with an embodiment, the first server 128 associated with each of the analytics node 122A and the archival database node 124 may be configured to transmit, to the analytics node 122A, a query for one or more first transaction records stored on the analytics node 122A. In an exemplary scenario, the one or more first transaction records may be frequently queried by the first server 128. The one or more first transaction records may be queried, for example, to resolve a dispute between an organization that manages the first MaaS network 102 and one or more mobility providers of the first MaaS network 102, or between two or more mobility providers of the first MaaS network 102.

The first server 128 may further receive the queried one or more first transaction records from the analytics node 122A. The received one or more first transaction records may be, for example, related to the transaction messages associated with a same mobility provider or different mobility providers. Moreover, the first server 128 may verify the one or more transactions associated with the queried one or more first transaction records. The verification of the one or more transactions may be performed by the first server 128, for example, to resolve the dispute. For example, the first server 128 may determine a total amount of transactions and amounts of revenue distributed amongst the organization (i.e. that manages the first MaaS network 102) and the one or more mobility providers that may have provided mobility services associated with the transactions. The first server 128 may verify a match between the total amount of transactions and the total amounts of distributed revenues. Further, the first server 128 may verify that the distribution of the revenue is according to a pre-defined revenue distribution agreement amongst the organization and the various mobility providers of the first MaaS network 102. In an embodiment, the revenue distribution may be based on protocols associated with distributed ledger technologies such as a smart contract. Thus, the first server 128 may verify that the distribution of the revenue is in accordance with the smart contract amongst the organization and the various mobility providers of the first MaaS network 102.

In accordance with an embodiment, the first server 128 may be further configured to transmit a query for one or more second transaction records stored on the archival database node 124 to the archival database node 124. The first server 128 may further receive the queried one or more second transaction records from the archival database node 124. The one or more second transaction records stored on the archival database node 124 may be queried, for example, to enable dispute resolution, audit, and compliance tasks associated with the first MaaS network 102.

The first server 128 may further display statistical information associated with the queried one or more second transaction records. The statistical information associated with the queried one or more second transaction records may include a transaction identification (ID) of each of the queried one or more second transaction records, a timestamp associated with each of the queried one or more second transaction records, and/or a routing path of each of the queried one or more second transaction records. The statistical information may further include a distribution of transaction records across each mobility provider, a distribution of transaction value across each mobility provider, a distribution of transaction records across days, weeks, months, or years; and/or a distribution of transaction records across users of the first MaaS network 102.

In accordance with an embodiment, the cache database node 126 may be configured to receive the queried one or more second transaction records from the archival database node 124. The cache database node 126 may store the received one or more second transaction records on the cache database node 126. The cache database node 126 may further receive a query for one or more third transaction records from the first server 128. The one or more third transaction records may be included in the one or more second transaction records stored on the cache database node 126. The cache database node 126 may transmit the one or more third transaction records, to the first server 128, based on the received query for the one or more third transaction records. In some embodiments, the one or more third transaction records may be frequently queried transaction records of the archival database node 124. Thus, the one or more third transaction records may be easily accessed by the first server 128, for use, such as for dispute resolution, audit, and compliance tasks associated with the first MaaS network 102.

In an embodiment, to scale-up the first MaaS network 102, one or more new node packages may be added to the plurality of node packages 120. Each of the one or more new node packages may include a subscriber node and a pre-configured set of nodes for a mobility provider (e.g., a local MP node) and a MaaS provider (e.g., a local MaaS node). To enhance the transaction performance and throughput, the subscriber node and the pre-configured set of nodes of the one or more new node packages may be deployed as one of, but is not limited to, edge nodes, edge devices, or fog or cloud computing capable devices. The MaaS provider node (e.g., the local MaaS node) may be connected with the analytics node 122A (e.g., a central node) for data consolidation. Further, the subscriber node of the new node package may be connected to the broker layer 106 (including the broker node device 112) through the plug-in interface. In an embodiment, the analytics node 122A may be a node of the distributed ledger 118 associated with the MaaS provider.

Once the MaaS provider node (e.g., the local MaaS node) may be connected with the analytics node 122A, the MaaS provider node (e.g., the local MaaS node) may select a first group of transaction records from a plurality of transaction records stored on the MaaS provider node (e.g., the local MaaS node) and transmit the selected first group transaction records to the analytics node 122A for storage. The selection of the first group of transaction records may be based on a storage duration of each of the plurality transaction record on the MaaS provider node (e.g., the local MaaS node) and a data retention threshold associated with the MaaS provider node (e.g., the local MaaS node). Further, the analytics node 122A may be configured to select a second group of transaction records from a third group of transaction records stored on the analytics node 122A and transmit the selected second group of transaction records to the archival database node 124 for storage. The selection and transmission of the second set of transaction records may be based on a receipt of an instruction from the MaaS provider node (e.g., the local MaaS node) by the analytics node 122A. The selection of the second set of transaction records may be based on the second storage duration of the third set of transaction records on the analytics node 122A and the second data retention threshold of the analytics node 122A. In an embodiment, the third group of transaction records may include at least the first group of transaction records. For example, U.S. patent application Ser. No. 17/178,185 filed on Feb. 17, 2021, discloses the data retention threshold and the storage duration in detail. It may be noted that the data retention threshold and the storage duration discussed by the referenced application is merely an example. Although, there may be different other examples for the data retention threshold and the storage duration, without departure from the scope of the disclosure.

In an embodiment, each node package of the plurality of node packages 120 may be implemented as one of a set of edge nodes, a set of edge devices, or a set of fog or cloud computing capable devices. The nodes of each node package (e.g., a subscriber node, an MP node, and a MaaS node) may be deployed in a physical proximity to the plurality of publisher nodes 110A-110N (i.e., the client layer 104) of the first MaaS network 102. The physical proximity may reduce a transaction latency and may limit capacity of the client layer 104 based on a performance limit of the plurality of node package 120, which may further lead to a reduction of transaction failures. Further, transaction handling capacity of the first MaaS network 102 may be scaled-up by addition of new node packages to the first MaaS network 102. Each of such node package may be easily set-up based on a configuration template, wherein a pre-configured set of MP node and MaaS node may be coupled to a subscriber node. The subscriber node of the new node package may be connected to the broker node device 112 of the first MaaS network 102 through the plug-in interface. Further, the MaaS node of the new node package may be connected to the analytics node 122A. The MaaS node may thereafter start archival of the transaction records to the analytics node 122A and then to the archival database node 124, as described in the aforementioned. Moreover, the analytics node 122A may utilize the transaction records merged from the plurality of MaaS nodes 118A, 1188, . . . 118N, for the revenue distribution amongst the MaaS provider and the one or more mobility providers, and data analytics.

Figure 2:
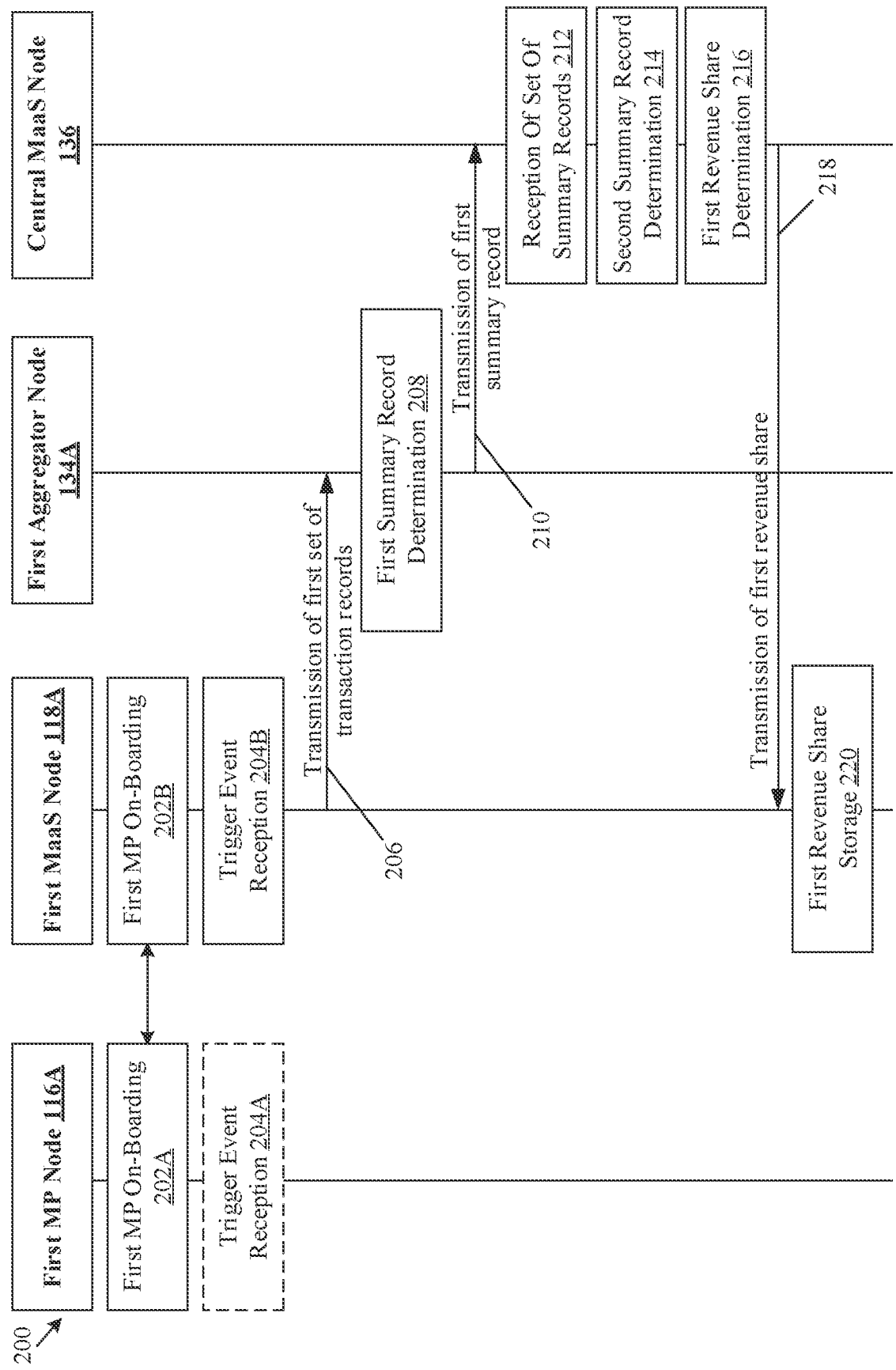
FIG. 2 is an exemplary sequence diagram that depicts revenue share determination for large-scale transactions on a Mobility-as-a-Service (MaaS) platform with a common database architecture, in accordance with an embodiment of the disclosure.

FIG. 2 is an exemplary sequence diagram that depicts revenue share determination for large-scale transactions on a Mobility-as-a-Service (MaaS) platform with a common database architecture, in accordance with an embodiment of the disclosure. FIG. 2 is explained in conjunction with elements from FIG. 1. With reference to FIG. 2, there is shown a sequence diagram 200 that illustrates a sequence of operations from 202A to 220. The sequence of operations may be executed by various nodes of the first MaaS network 102 (such as, the first MP node 116A, the first MaaS node 118A, the first aggregator node 134A, and the central MaaS node 136) of FIG. 1.

At 202A and 202B, the first MP node 116A may be on-boarded to the first node package 120A. In an embodiment, the first MP node 116A and the first MaaS node 118A may be configured to communicate with each other to on-board the first MP node 116A to the first node package 120A. In an embodiment, based on the communication of the first MP node 116A and the first MaaS node 118A for the on-boarding, the first MP corresponding to the first MP node 116A and the first MaaS player associated with the first MaaS node 118A may get associated with the first MaaS network 102. In an embodiment, when a mobility provider (MP) joins the first MaaS network 102 or adds an MP node corresponding to the mobility provider to a newly created node package, the new MP node may be on-boarded to the new node package, based on an agreement or a smart contract with a MaaS player corresponding to a new MaaS node associated with the new node package. For example, a first MP corresponding to the first MP node 116A may be on-boarded to the first node package 120A based on an association with a first MaaS player corresponding to the first MaaS node 118A of the first node package 120A. The association of the first MP and the first MaaS player with the first MaaS network 102 may be based on a service agreement, a revenue sharing model, a data ownership agreement, a terms of service agreement, a privacy policy, and/or a policy amendment associated with a region of operation of at least one of the first MP or the first MaaS player. For example, the on-boarding of the first MP node 116A may include a registration of a data owner (for example, an organization or person who owns, operates, manages or has a stake in the first mobility provider) associated with the first MP node 116A. In an embodiment, information required for the registration may be received from the administrator 132, via the administrator device 130. The first MP node 116A may provide the information required for the registration to the first MaaS node 118A, and the first MaaS node 118A may create a data ownership agreement based on the registration. Post the on-boarding, the first MP, the first MaaS player, and the first MaaS network 102 may be bound by the data ownership agreement.

In an embodiment, the onboarding of the first MP node 116A may further include generation of configuration data associated with the first MP. The configuration data may include a revenue sharing configuration associated with the first MP and the first MaaS provider. The revenue sharing configuration may be created based on a user input received from the data owner of the first MP node 116A, via a computing device of the data owner. The revenue sharing configuration may also be created or modified based on a user input received from the administrator 132, via the administrator device 130. The revenue sharing configuration may include a set of consents associated with the first MP to share transaction data associated with the first MP. For example, the set of consents may include a first consent from the first MP to allow or deny a submission of transaction records associated with the first MP for the revenue calculation by the first MaaS network 102 and/or the system 126. The set of consents may further include a second consent from the first MP to allow or deny an access of the submitted transaction records by a MaaS player for revenue summarization and sales transaction sharing. The set of consents may further include a third consent from the first MP to allow or deny an access of the transaction records in case of a query from other mobility providers. In case, the third consent indicates an allowance to access the transaction records, the third consent may also include information indicative of mobility providers and/or MaaS players of the first MaaS network 102 with which the transaction records may be shared in response to a query. The set of consents may further include a fourth consent from the first MP to allow, partially allow, or deny an archival of the transaction records based on a request from another mobility provider. In case of partial allowance, the fourth consent may also include information indicative of mobility providers and/or MaaS players of the first MaaS network 102 with which the transaction records may be shared for archival. The configuration data including the revenue sharing configuration may be stored on the configuration database 138.

The on-boarding may further include a registration of a service agreement for business processes between the first MP corresponding to the first MP node 116A and the first MaaS player corresponding to the first MaaS node 118A associated with the first node package 120A. The registration of the service agreement may be based on certain terms of service and privacy policy, which may be mutually agreed upon by both the first MP and the first MaaS player. The first MP node 116A may create the service agreement, the terms or service, and the privacy policy based on a confirmation received from the first MP node 116A and/or the administrator device 130 (based on a user input of the administrator 132). Further, the on-boarding of the first MP node 116A may be based on a certain revenue sharing model that may specify information such as a percentage or ratio of revenue or royalty for the first MP based on a count of transactions of the first MP node, an amount or value of transactions, MaaS platform fees, fees for the first MaaS player, a penalty associated with a carbon footprint of vehicles of the first MP, and/or an incentive associated with clean fuel usage by the first MP. The on-boarding may further include data registration based on terms of use of transaction data associated with the first MP. In certain scenarios, the first MP and/or the first MaaS player may operate in multiple geographical regions or legal jurisdictions. In such cases, the on-boarding may also include a policy amendment that may be applicable to the service agreement, the terms of service, the privacy policy, and/or the terms of use, based on the legal requirements of the geographical region of operation of at least one of the first MP or the first MaaS player.

Based on the on-boarding of the first MP node 116A to the first node package 120A, the first MP node 116A may be added to the first node package 120A and a first smart contract may be created between the first MP and the first MaaS player. In other words, the first MP node 116A of the first node package 120A may be associated with the first MaaS node 118A based on the first smart contract. In some embodiments, the first smart contract may be executed to determine a revenue share associated with the first MP based on a set of transaction records of the first MP node 116A. The on-boarding of the first MP node 116A may ensure that the determination of the revenue share of the first MP may be as per a set of pre-agreed terms and conditions, privacy policy, and service agreement (or the first smart contract) between the first MP and the first MaaS player. Thus, based on the on-boarding of the first MP node 116A, the determination of the revenue share of the first MP may be offloaded to the system 126, while terms and conditions, privacy policy, and service agreement between the first MP and the first MaaS player may still be enforceable and valid. This may address data privacy and contractual concerns between the first MP and the first MaaS player. An entity-relationship (ER) diagram for the on-boarding of an MP node and revenue calculation for a mobility player associated with the MP node is described further, for example, in FIG. 6. A sequence of operations for the on-boarding process for an MP node is described further, for example, in FIG. 7.

In another embodiment, the first MaaS network 102 may include a plurality of central MP nodes (not shown in FIG. 1 or FIG. 2). Each of the plurality of central MP nodes may be associated with a certain mobility provider and may be communicatively coupled to MP node(s) of the respective mobility provider. For example, a first central MP node may be associated with a first MP (and coupled to the first MP node 116A) and a second central MP node may be associated with a second MP (and coupled to the second MP node 116B). In some scenarios, each of multiple node packages may include an MP node associated with a single MP. In such cases, a single central MP node may be associated with each MP node (of that single MP), which may be included in such multiple node packages. In certain embodiments, the on-boarding process of an MP node may be executed by the central MP node associated with the MP node, which may be associated with the same mobility provider as the MP node.

At 204A (or 204B), a trigger event may be received. In an embodiment, the first MP node 116A (at 204A) and/or the first MaaS node 118A (at 204B) may be configured to receive the trigger event from the scheduler node 144. Though both 204A and 204B are shown in FIG. 2, in some embodiments, the trigger event may only be received by the first MaaS node 118A at 204B and not by the first MP node 116A, without departure from the scope of the disclosure. In such case, 204A may be omitted from the sequence diagram 200.

In an embodiment, the scheduler node 144 may be configured to generate the trigger event associated with the first node package 120A. In an embodiment, the trigger event may be generated based on at least one of a pre-determined schedule or a reception of a pre-defined number of transaction records at the first MaaS node 118A. For example, the trigger event may be generated at an end of each day (say, at 11:59:59 PM each day). In another example, the trigger event may be generated upon receipt of a certain pre-defined number of transaction records (say, a hundred thousand transaction records) associated with the first MP node 116A at the first MaaS node 118A. The first MaaS node 118A (and/or the first MP node 116A) may be configured to receive the trigger event from the scheduler node 144.

At 206, a first set of transaction records associated with the first MP node 116A may be transmitted. In an embodiment, the first MaaS node 118A may be configured to transmit the first set of transaction records associated with the first MP node 116A to the first aggregator node 134A of the system 126. The first aggregator node 134A may be configured to receive the first set of transaction records from the first MaaS node 118A. Each of the first set of transaction records may be associated with a transaction message received by the first subscriber node 114A of the first node package 120A. In an example, the first set of transaction records associated with the first MP node 116A may include transaction records of a certain pre-determined time period (e.g., a certain day) for the first MP node 116A, in case the trigger event is generated at the end of each day. In another example, the first set of transaction records may include a certain pre-defined number of transaction records (e.g., a most recent hundred thousand transaction records) of the first MP node 116A, in case the trigger event is generated on receipt of a set of hundred thousand transaction records associated with the first MP node 116A.

At 208, a first summary record associated with the first MP node 116A may be determined. In an embodiment, the first aggregator node 134A may be configured to determine the first summary record associated with the first MP node 116A, based at least on an aggregation of a transaction amount associated with each of the received first set of transaction records. For example, the first aggregator node 134A may determine a sum of a transaction amount or a transaction value of each of the received first set of transactions and determine the first summary record based on the determined sum. In an embodiment, the first summary record may indicate a total transaction amount of the received first set of transactions. The determination of the first summary record is described further, for example, in FIG. 5.

In an embodiment, the determination of the first summary record associated with the first MP node 116A may be further based on a first set of parameters. Examples of the first set of parameters may include company information associated with the first MP, service item information associated with each of the first set of transaction records, ticket sales data associated with each of the first set of transaction records, fare price master data associated with the first MP, service price master data associated with the first MP, and/or ticket transaction data associated with each of the first set of transaction records. For example, the company information associated with the first MP may include a name, an address, a number of vehicles, and/or type of vehicles, associated with a company corresponding to the first MP. The service item information associated with each of the first set of transaction records may include a date/time of a trip leg, a duration of the trip leg (based on get-in/get-out transaction messages), a distance travelled on the trip leg, and/or a type of vehicle associated with the trip leg, associated with each of the first set of transaction records. The ticket sales data associated with each of the first set of transaction records may include a price of a ticket for the trip, and/or a price of the trip leg associated with the first MP, associated with each of the first set of transaction records. The fare price master data associated with the first MP may include a trip-leg distance-based fare table, and/or a trip-leg duration-based fare table associated with the first MP. The service price master data associated with the first MP may include a traffic surcharge, a wait-time surcharge, a trip-leg duration surcharge, a day-of-week based surcharge, a time-of-day based surcharge, a holiday surcharge, and/or a service tax, associated with the first MP. The ticket transaction data associated with each of the first set of transaction records may include, but is not limited to, transaction data corresponding to a trip-leg associated with the first MP, from ticket data in each of the first set of transaction records.

In an embodiment, the determination of the first summary record may be further based on an application of a Big Data platform, a Hadoop platform, and/or a MapReduce platform on at least one of the transaction amount associated with each of the received first set of transaction records or the first set of parameters. For example, the first aggregator node 134A may offload the determination of the first summary record to the Big Data platform and parallelize the determination of the first summary record based on the received first set of transaction records and/or the first set of parameters. Based on the use of the Big Data platform, large-scale transactions (for example, millions of transaction records) associated with the first MP node 116A may be processed in parallel and the first summary record may be determined efficiently, in a lesser time and in a more cost-effective manner than conventional systems.

At 210, the first summary record may be transmitted. In an embodiment, the first aggregator node 134A may be configured to transmit the determined first summary record associated with the first MP node 116A to the central MaaS node 136. The central MaaS node 136 may be configured to receive the first summary record from the first aggregator node 134A.

At 212, a set of summary records may be received. In an embodiment, the central MaaS node 136 may be configured to receive the set of summary records associated with the first MP node 116A from the plurality of aggregator nodes 134. The set of summary records may at least include the first summary record received from the first aggregator node 134A.

At 214, a second summary record may be determined. In an embodiment, the central MaaS node 136 may be configured to determine the second summary record associated with the first MP node 116A based at least on an aggregation of a transaction amount associated with each of the received set of summary records. For example, the central MaaS node 136 may aggregate the transaction amount associated with each of the received set of summary records to determine a total transaction amount of each of a plurality of transaction records associated with the first MP node 116A stored at the various node packages of the first MaaS network 102. In an embodiment, the second summary record may indicate the total transaction amount of each of the plurality of transaction records associated with the first MP node 116A stored at the various node packages of the first MaaS network 102. The determination of the second summary record is described further, for example, in FIG. 5.

One or more of the plurality of aggregator nodes 134 may already have rolled-up the transaction amounts of the plurality of transaction records once to determine the set of summary records. Hence, the determination of the second summary record (based on the aggregated transaction amount associated with the set of summary records) may be a less computationally expensive task for the central MaaS node 136. In an embodiment, the determination of the second summary record may not be parallelized. However, in certain scenarios, the first MaaS network 102 may be a large network with a large number of node packages and may also operate in multiple geographies. In such cases, the determination of the second summary record may be parallelized, for example, based on use of a Big Data platform, a Hadoop platform, and/or a MapReduce platform.

At 216, a first revenue share may be determined. In an embodiment, the central MaaS node 136 may be configured to determine the first revenue share associated with the first MP corresponding to the first MP node 116A based on the determined second summary record. For example, the second summary record may include a total transaction amount of each transaction corresponding to the plurality of transactions records associated with the first MP node 116A. The first revenue share associated with the first MP may be determined based on the total transaction amount. The total transaction amount may be used as an indicator of a revenue or royalty earned by the first MP to provide services to customers through the first MaaS network 102 during a certain time frame or accounting period. The determination of the first revenue share is described further, for example, in FIG. 5.

In an embodiment, the monitor node 122B may be configured to periodically monitor the set of impact factors associated with the first MP. For example, the set of impact factors may be monitored at an end of each day (such as, at 11:59:59 PM). The set of impact factors may be determined based on the configuration data associated with the first MP, which may be stored in the configuration database 138. Examples of the set of impact factors may include an incubation or innovation of a new mobility mode, an environmental sustainability, a carbon-dioxide impact, a total economic growth, a traffic capacity normalization, and/or health and welfare initiatives. The set of impact factors associated with the first MP may be used to determine incentives or penalties that may be applicable on the first revenue share of the first MP. In an embodiment, the monitor node 122B may generate historical data associated with the set of impact factors based on the periodically monitored values of each of the set of impact factors. For example, the monitor node 122B may compare first values of the set of impact factors determined in a previous time interval with second values of the set of impact factors determined in the current time interval to determine trends of changes in the values of the set of impact factors. The determined trends of changes may be stored as the historical data. The historical data may also include the first values and the second values of the set of impact factors. The monitor node 122B may periodically (for example, at the end of each day) transmit the trends of changes of the values of the set of impact factors associated with the first mobility provider to the central MaaS node 136.

In an embodiment, the determination of the first revenue share associated with the first MP may be further based on a second set of parameters. Examples of the second set of parameters may include a fee associated with a first MaaS player corresponding to the first MaaS node, a carbon footprint associated with the first MP, a green energy incentive earned by the first MP, a traffic jam mitigation achieved by the first MP, and/or a fare slab related to rides associated with the first MP. In an embodiment, the central MaaS node 136 may be configured to determine the second set of parameters based on the trends of changes of the values of the set of impact factors associated with the first MP. For example, the carbon footprint may be determined based on the carbon-dioxide impact. Further, the green energy incentive may be determined based on the incubation or innovation of a new mobility mode, and/or the environmental sustainability. The traffic jam mitigation may be determined based on the traffic capacity normalization.

For example, the first MaaS player may levy a fixed fee (such as, 10% of transaction amount) on each transaction. Based on a carbon footprint of vehicles of the first MP, the first MP may be incentivized or penalized a certain percentage points of the transaction amount on each transaction. Similarly, based on a green energy source used by the first MP, the first MP may earn an incentive on each transaction. Further, an extent of traffic jams mitigated by the vehicles of the first MP may be determined based on a total number of rides (or number of customers transported) in peak hours or traffic hotspots. The first MP may be incentivized based on the extent of traffic jams mitigated. In addition, the first MP may be incentivized or penalized based on the fare slab related to the rides associated with the first MP. For example, the first MP may be incentivized or penalized based on a traffic surcharge, a wait-time surcharge, a trip-leg duration surcharge, a day-of-week based surcharge, a time-of-day based surcharge, and/or a holiday surcharge.

In an embodiment, the determination of the first revenue share associated with the first MP may be further based on an application of the AI system 146 (for example, the AI Model 812D of FIG. 8) on at least one of the determined second summary record or the second set of parameters. The AI system 146 may be pre-trained on a revenue share determination task. In an embodiment, the AI system 146 may be trained based on the configuration data associated with the first MP stored on the configuration database 138, the revenue model, the service agreement, the terms or service, and/or the privacy policy. The central MaaS node 136 may feed the determined second summary record and/or the second set of parameters to the AI system 146. The AI system 146 may determine the first revenue share associated with the first MP based on the fed second summary record and/or the second set of parameters.

In an embodiment, the AI system 146 may be further trained on an environmental impact analysis task. In an embodiment, the AI system 146 may determine a score for the trends of changes of the values of each of the set of impact factors associated with the first MP. Based on the determined score, the AI system 146 may predict a future change in values of the set of impact factors associated with the first MP. The predicted future changes in the values of the set of impact factors may be indicative of a future environmental impact of an operation of the first MP. The central MaaS node 136 may update the determined first revenue share associated with the first MP based on the predicted change in the values of the set of impact factors associated with the first MP. For example, in case the predicted change in the values of the carbon-dioxide impact is a positive change, the future carbon-dioxide impact may indicate reduced carbon-dioxide levels. In such case, the determined first revenue share may be updated with an incentive for a positive future carbon-dioxide impact. Similarly, the determined first revenue share may be updated with incentives for positive future capacity normalization and positive future environmental sustainability. For example, in certain scenarios, such incentives for the first MP may be payable as a governmental subsidy to the first MP for positive future environmental impacts of an operation of the first MP. In certain scenarios, based on the positive future environmental impacts, the central MaaS node 136 may update the configuration data for the first MP store on the configuration database 138. For example, initially, the configuration data for the first MP may indicate that 10% of the revenue (i.e. earned by the first MP) may be shared with the first MaaS player as a MaaS fees. However, based on the positive future environmental impacts, the central MaaS node 136 may update the configuration data for the first MP such that the updated configuration for the first MP may indicate that 7% of the revenue earned by the first MP may be payable as the MaaS fees to the first MaaS player. Thus, based on the positive future environmental impacts of an operation of the first MP, the MaaS fees of the first MaaS player may be reduced by 3%, and thereby the first MP may be indirectly incentivized.

The central MaaS node 136 may periodically update the configuration data associated with the first MP stored on the configuration database 138 based on the prediction of a new future environmental impact of an operation of the first MP at the end of a periodic interval (e.g., at the end of each day) by the AI system 146. The monitor node 122B may then use the updated configuration data to monitor new values for the set of impact factors associated with the first MP at the end of the periodic interval. Further, the central MaaS node 136 may determine new values for the second set of parameters based on the newly monitored values of the set of impact factors. The central MaaS node 136 may determine the first revenue share associated with the first MP by use of the AI system 146 based on the new values of the second set of parameters.

At 218, the determined first revenue share may be transmitted. In an embodiment, the central MaaS node 136 may be configured to transmit the determined first revenue share associated with the first MP to the first MaaS node 118A. The first MaaS node 118A may receive the determined first revenue share from the central MaaS node 136. In some embodiments, the central MaaS node 136 may also transmit the first revenue share to the first MP node 116A.

At 220, the first revenue share may be stored. In an embodiment, the first MaaS node 118A may be configured to store the received first revenue share associated with the first MP. In an embodiment, the first MaaS node 118A may transmit the first revenue share associated with the first MP to the first MP node 116A. The transmitted information about the first revenue share may act as a consolidated report for the first MP associated with the first MP node 116A. The first MP node 116A may verify the first revenue share based on a plurality of transaction records stored on the first MP node 116A. Herein, the plurality of transaction records may include at least the first set of transaction records. The first MP node 116A may transmit a result of the verification as first verification information to the first MaaS node 118A. The first MaaS node 118A may further cross-verify the verified first revenue share based on the first verification information and the first set of transaction records stored on the first MaaS node 118A. The cross-verification of the first revenue share as correct may indicate that there may be consensus between the first MP and the first MaaS player for the determined first revenue share for the first MP. The first MaaS node 118A may be configured to store the cross-verified first revenue share in the first MaaS node 118A. In an embodiment, the first revenue share may also be stored on the first MP node 116A. The verification and storage of the first revenue share is described further, for example, in FIG. 3.

In an embodiment, post the determination of the first revenue share (and in some cases, after the cross-verification of the first revenue share), a final amount associated with the first revenue share may be stored in a distributed ledger node (e.g., the first MaaS node 118A and/or the first MP node 116A). Along with the storage of the final amount, a sign-off status, transaction history, and an evidence pointer associated with transaction records (i.e. related with the first revenue share) may also be stored on the distributed ledger node. Herein, the sign-off status (or sign-off point) may correspond to an indication of a final settlement of the revenue share. Further, the evidence pointer may correspond to a most recent status of proof data that may be updated with respect to the sign-off point. The final amount, sign-off status, transaction history and the evidence pointer associated with the transactions related to the first revenue share are collectively hereinafter referred as evidence data. The first verification information is hereinafter also referred as feedback data from the first MP node 116A. The first MaaS node 118A may further extract a current (i.e., the latest) value of the configuration data associated with the first MP from the configuration database 138 and store the extracted current (or latest) value of the configuration data associated with the first MP. The evidence data related to the first revenue share, the feedback data from the first MP node 116A, and the configuration data associated with the first mobility provider may be stored on the first MaaS node 118A for traceability and audit purposes. In an embodiment, in case of an unsuccessful cross-verification, the first MaaS node 118A may determine that there may be cheating or fraud by a data owner (for example a mobility player) who may have captured the transaction records related to the first revenue share. In such case, the first MaaS player may impose a penalty on the data owner. An amount of the penalty may be determined based on a difference of an expected transaction amount associated with the first revenue share and an actual transaction amount associated with the first revenue share.

In an embodiment, the first MaaS node 118A may transmit the received first revenue share associated with the first MP to the analytics node 122A. The analytics node 122A may also store the first revenue share associated with the first MP. Also, the analytics node 122A may transmit the first revenue share to the archival database node 124 for long-term storage based on a data retention threshold (e.g., one month) associated with the analytics node 122A and a storage duration of the first revenue share on the analytics node 122A. The archival database node 124 may store the first revenue share once the storage duration of the first revenue share on the analytics node 122A exceeds the data retention threshold associated with the analytics node 122A. For example, U.S. patent application Ser. No. 17/178,185 filed on Feb. 17, 2021, discusses the data retention threshold and the storage duration in detail. It may be noted that the data retention threshold and the storage duration discussed by the referenced application is merely an example. Although, there may be different other examples for the data retention threshold and the storage duration, without departure from the scope of the disclosure.

Figure 3:
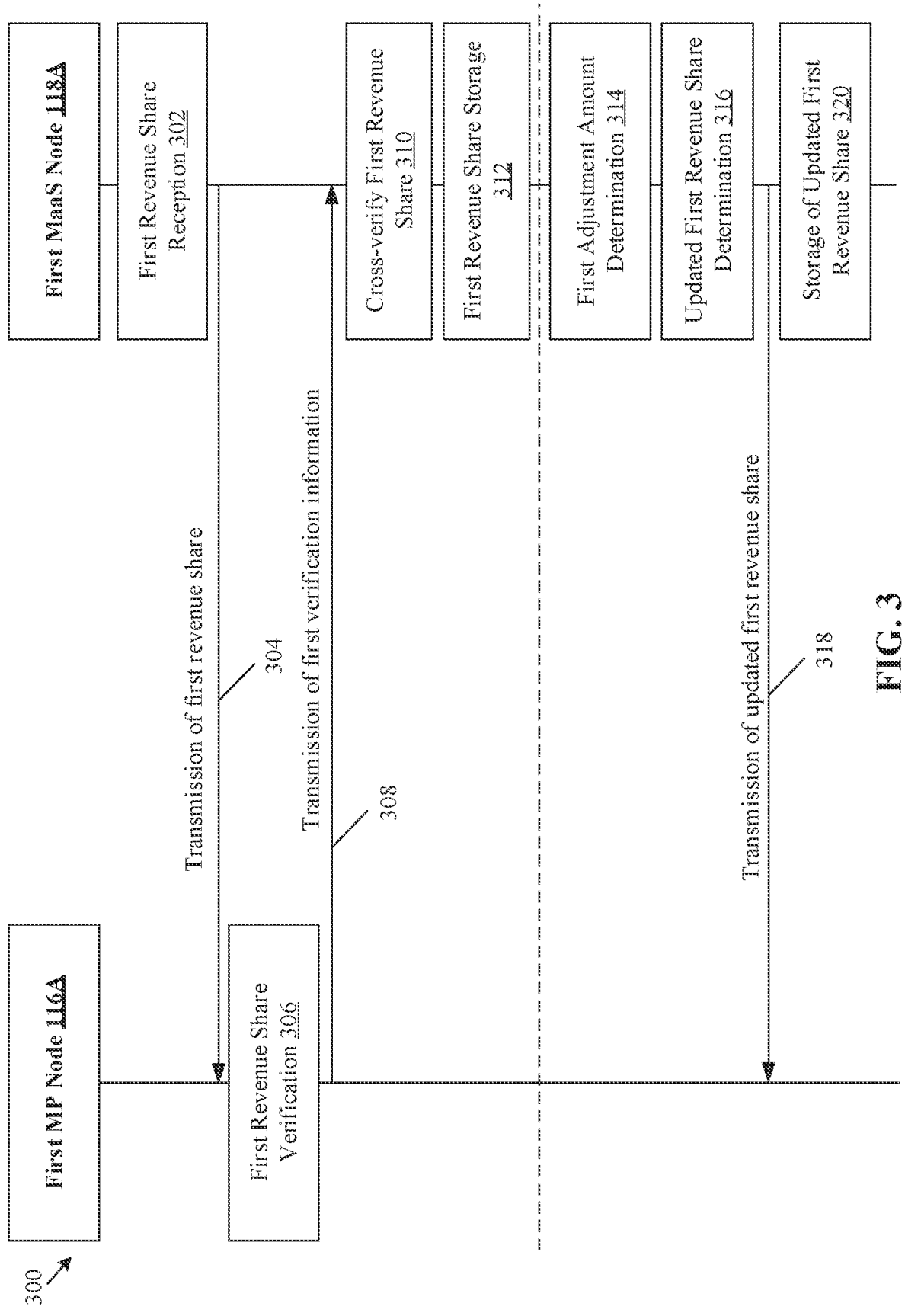
FIG. 3 is an exemplary sequence diagram that depicts verification of first revenue share associated with a first mobility provider (MP) corresponding to a first MP node of FIG. 1, in accordance with an embodiment of the disclosure.

FIG. 3 is an exemplary sequence diagram that depicts verification of first revenue share associated with a first mobility provider (MP) corresponding to a first MP node of FIG. 1, in accordance with an embodiment of the disclosure. FIG. 3 is explained in conjunction with elements from FIGS. 1 and 2. With reference to FIG. 3, there is shown a sequence diagram 300 that illustrates a sequence of operations from 302 to 318. The sequence of operations may be executed by various nodes of the first MaaS network 102 (such as, the first MaaS node 118A, and the first MP node 116A) of FIG. 1.

At 302, the first revenue share associated with the first MP may be received. In an embodiment, the first MaaS node 118A may be configured to receive the first revenue share associated with the first MP (corresponding to the first MP node 116A) from the central MaaS node 136. The determination of the first revenue share is described, for example, in FIG. 2.

At 304, the first revenue share may be transmitted. In an embodiment, the first MaaS node 118A may be configured to transmit the first revenue share associated with the first MP to the first MP node 116A. The first MP node 116A may receive the first revenue share from the first MaaS node 118A. In another embodiment, the first MaaS network 102 may include a plurality of central MP nodes (not shown in FIG. 1 or FIG. 3). Each of the plurality of central MP nodes may be associated with a certain mobility provider and may be communicatively coupled to MP node(s) of the respective mobility provider. For example, a first central MP node may be associated with a first MP (and coupled to the first MP node 116A) and a second central MP node may be associated with a second MP (and coupled to the second MP node 116B). In some scenarios, each of multiple node packages may include an MP node associated with a single MP. In such cases, a single central MP node may be associated with each MP node (of that single MP), which may be included in such multiple node packages.

In an embodiment, each central MP node may receive a revenue share associated with a corresponding MP from a respective MaaS node. The central MP node may then validate and store the revenue share associated with the corresponding MP in the central MP node associated with the MP, as described further in FIG. 3 (at operations 306 to 320). Though, in FIG. 3, the verification and storage of the first revenue share of the first MP is described with reference to the first MP node 116A, the first revenue share may be alternatively verified and stored by the first central MP node associated with the first MP, in a similar manner, without departure from the scope of the disclosure.

At 306, the received first revenue share may be verified. In an embodiment, the first MP node 116A may be configured to verify the received first revenue share based on a plurality of transaction records stored on the first MP node 116A. In an embodiment, the plurality of transaction records may include at least the first set of transaction records. For example, for the verification, the first MP node 116A may aggregate a transaction amount associated with each of the first set of transaction records. Further, the first MP node 116A may apply the AI system 146 on the aggregated transaction amount to estimate a second revenue share associated with the first MP. Thereafter, the first MP node 116A may compare the first revenue share with the second revenue share associated with the first MP to generate first verification information based on the comparison. The first verification information may be indicative of a result of the verification of the received first revenue share at the first MP node 116A. For example, the first verification information may indicate whether the first revenue share is same as the second revenue share, and if not, then by what amount does the first revenue share differ from the second revenue share. The first verification information may also include the second revenue share.

At 308, the first verification information may be transmitted. In an embodiment, the first MP node 116A may be configured to transmit the generated first verification information to the first MaaS node 118A. The first MaaS node 118A may receive the transmitted first verification information from the first MP node 116A. As described in the aforementioned, the first verification information may be indicative of the result of the verification of the received first revenue share at the first MP node 116A.

At 310, the first revenue share may be cross-verified. In an embodiment, the first MaaS node 118A may be configured to cross-verify the first revenue share associated with the first MP. In an embodiment, based on the first set of transaction records stored on the first MaaS node 118A, the first MaaS node 118A may be configured to verify the first revenue share to determine second verification information. For example, the first MaaS node 118A may aggregate a transaction amount associated with each of the first set of transaction records stored on the first MaaS node 118A. Further, the first MaaS node 118A may apply the AI system 146 on the aggregated transaction amount to estimate a third revenue share associated with the first MP. Thereafter, the first MP node 116A may compare the first revenue share with the third revenue share associated with the first MP to generate the second verification information based on the comparison. The second verification information may be indicative of a result of the verification of the first revenue share at the first MaaS node 118A. For example, the second verification information may indicate whether the first revenue share is same as the third revenue share, and if not, then by what amount does the first revenue share differ from the third revenue share. The second verification information may also include the third revenue share.

In an embodiment, the first MaaS node 118A may be further configured to compare the received first verification information with the determined second verification information. The first revenue share may be cross-verified based on the comparison of the first verification information with the determined second verification information. In case the first verification information is determined as same as the second verification information and the first revenue share equals both the second revenue share and the third revenue share, the determined first revenue share may be cross-verified as correct. In such case, the first revenue share may be stored on the first MaaS node 118A, as described at 312. However, in case the first verification information is determined as different from the second verification information, or the first revenue share is determined as different from at least one of the second revenue share or the third revenue share, control may pass to 314.

At 312, the first revenue share may be stored. In an embodiment, the first MaaS node 118A may be configured to store the first revenue share associated with the first MP based on the comparison between the first verification information and the second verification information, at 310. The first revenue share may be stored in case the first revenue share is cross-verified as correct, as described, for example, at 310. The cross verification of the first revenue share as correct may indicate that there may be consensus between the first MP and the first MaaS player for the determined first revenue share for the first MP. In an embodiment, the first revenue share may also be stored on the first MP node 116A. Control may pass to end.

At 314, a first adjustment amount may be determined. In an embodiment, the first MaaS node 118A may be configured to determine the first adjustment amount based on the comparison between the first verification information and the second verification information, at 310. In one scenario, the first verification information and the second verification information may be determined as same, however, the first revenue share may be determined to differ from both the second revenue share and the third revenue share. Herein, the second revenue share and the third revenue share may be the same. In such a scenario, the first adjustment amount may be determined as a difference between the first revenue share and the second revenue share (or the third revenue share). In another scenario, the first verification information may be determined as different from the second verification information. Herein, the second revenue share and the third revenue share may be determined as different. In such scenario, the first MaaS node 118A may determine the first adjustment amount based on an application the terms of service and/or the service agreement (between the first MP and the first MaaS player) on the first revenue share, the second revenue share, and/or the third revenue share.

At 316, an updated first revenue share may be determined. In an embodiment, the first MaaS node 118A may be configured to update the first revenue share associated with the first MP based on the determined first adjustment amount. For example, the first MaaS node 118A may add (or subtract) the first adjustment amount and the first revenue share to determine the updated first revenue share, based on whether the first adjustment amount corresponds to a positive adjustment (or a negative adjustment) associated with the first revenue share. Thus, the first revenue share associated with the first MP may be corrected based on the determined first adjustment amount. The cross-verification of the first revenue share and/or the correction of the first revenue share based on the first adjustment amount may ensure that true and correct revenue distribution is carried out between the mobility providers of the first MaaS network 102. The cross-verification of the first revenue share and/or the correction of the first revenue share based on the first adjustment amount may further indicate that there may be consensus between the first MP and the first MaaS player for the determined first revenue share for the first MP and/or for the correction of the first revenue share.

At 318, the updated first revenue share may be transmitted. In an embodiment, the first MaaS node 118A may be configured to transmit the updated first revenue share to the first MP node 116A. The first MP node 116A may receive the updated first revenue share from the first MaaS node 118A. In an embodiment, the first MP node 116A may store the updated first revenue share received from the first MaaS node 118A.

At 320, the updated first revenue share may be stored. In an embodiment, the first MaaS node 118A may be configured to store the updated first revenue share on the first MaaS node 118A.

Figure 4:
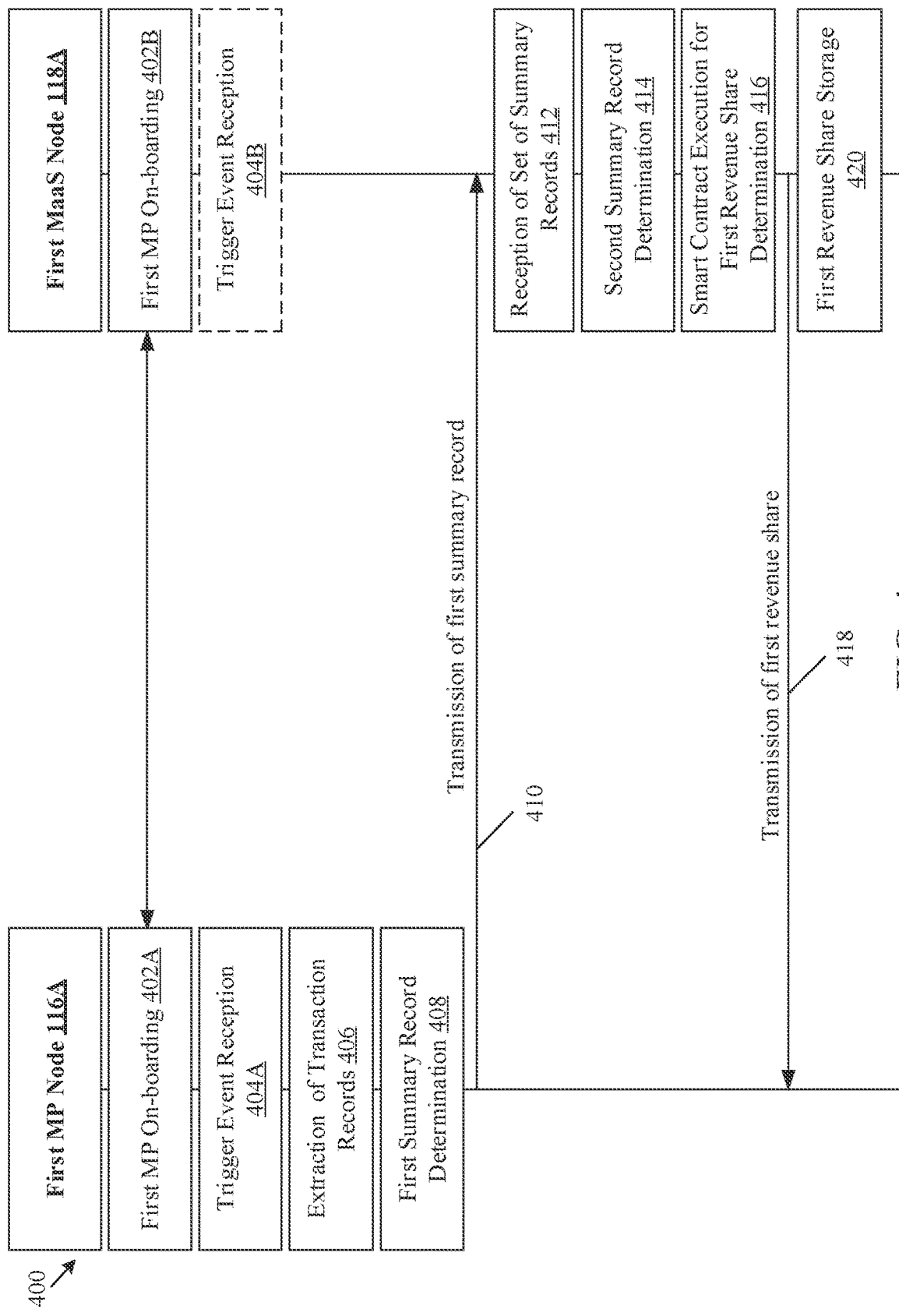
FIG. 4 is an exemplary sequence diagram that depicts revenue share determination for small-scale or medium-scale transactions on a Mobility-as-a-Service (MaaS) platform with a common database architecture, in accordance with an embodiment of the disclosure.

FIG. 4 is an exemplary sequence diagram that depicts revenue share determination for small-scale or medium-scale transactions on a Mobility-as-a-Service (MaaS) platform with a common database architecture, in accordance with an embodiment of the disclosure. FIG. 4 is explained in conjunction with elements from FIG. 1, FIG. 2, and FIG. 3. With reference to FIG. 4, there is shown a sequence diagram 400 that illustrates a sequence of operations from 402A to 420. The sequence of operations may be executed by various nodes of the first MaaS network 102 (such as, the first MP node 116A, and the first MaaS node 118A) of FIG. 1.

At 402A and 402B, the first MP node 116A may be on-boarded to the first node package 120A. In an embodiment, the first MP node 116A and the first MaaS node 118A may be configured to communicate with each other to on-board the first MP node 116A to the first node package 120A. In an embodiment, based on the communication of the first MP node 116A and the first MaaS node 118A for the on-boarding, the first MP corresponding to the first MP node 116A and the first MaaS player associated with the first MaaS node 118A may get associated with the first MaaS network 102. The association of the first MP and the first MaaS player with the first MaaS network 102 may be based on a service agreement, a revenue sharing model, a data ownership agreement, a terms of service agreement, a privacy policy, and/or a policy amendment associated with a region of operation of at least one of the first MP or the first MaaS player. Based on the on-boarding of the first MP node 116A to the first node package 120A, the first MP node 116A may be added to the first node package 120A and a first smart contract may be created between first MP and the first MaaS player. In other words, the first MP node 116A of the first node package 120A may be associated with the first MaaS node 118A based on the first smart contract. In an embodiment, the first smart contract may be executed to determine a revenue share associated with the first MP based on a set of transaction records of the first MP node 116A, as described at 416. The on-boarding of the first MP node 116A is described further, for example, in FIG. 2 (at 202A and 202B). An ER diagram for the on-boarding of an MP node and revenue calculation for a mobility player associated with the MP node is described further, for example, in FIG. 6. A sequence operation for the on-boarding process for an MP node is described further, for example, in FIG. 7.

In another embodiment, the first MaaS network 102 may include a plurality of central MP nodes (not shown in FIG. 1 or FIG. 4). Each of the plurality of central MP nodes may be associated with a certain mobility provider and may be communicatively coupled to MP node(s) of the respective mobility provider. For example, a first central MP node may be associated with a first MP (and coupled to the first MP node 116A) and a second central MP node may be associated with a second MP (and coupled to the second MP node 116B). In some scenarios, each of multiple node packages may include an MP node associated with a single MP. In such cases, a single central MP node may be associated with each MP node (of that single MP), which may be included in such multiple node packages. In certain embodiments, the on-boarding process of an MP node may be executed by the central MP node associated with the MP node, which may be associated with the same mobility provider as the MP node.

At 404A (or 404B), a trigger event may be received. In an embodiment, the first MP node 116A (at 404A) and/or the first MaaS node 118A (at 404B) may be configured to receive the trigger event from the scheduler node 144. Though both 404A and 404B are shown in FIG. 4, in some embodiments, the trigger event may only be received by the first MP node 116A at 404A and not by the first MaaS node 118A, without departure from the scope of the disclosure. In such case, 404B may be omitted from the sequence diagram 400. In an embodiment, the scheduler node 144 may be configured to generate the trigger event associated with the first node package 120A. In an embodiment, the trigger event may be generated based on at least one of a pre-determined schedule or a reception of a pre-defined number of transaction records at the first MaaS node 118A. The reception of the trigger event is described further, for example, in FIG. 2 (at 204A and 204B).

At 406, a first set of transaction records may be extracted. In an embodiment, the first MP node 116A may be configured to extract the first set of transaction records associated with the first MP node 116A from the first MaaS node 118A, based on the reception of the trigger event. In another embodiment, the first set of transaction records may be extracted from the first MP node 116A instead of the first MaaS node 118A. Each of the first set of transaction records may be associated with a transaction message received by the first subscriber node 114A of the first node package 120A. In an example, the first set of transaction records associated with the first MP node 116A may include transaction records of a certain pre-determined time period (e.g., a certain day) for the first MP node 116A, in case the trigger event is generated at the end of each day. In another example, the first set of transaction records may include a certain pre-defined number of transaction records (e.g., a most recent thousand transaction records) of the first MP node 116A, in case the trigger event is generated on receipt of a set of thousand transaction records associated with the first MP node 116A.

At 408, a first summary record associated with the first MP node 116A may be determined. In an embodiment, the first MP node 116A may be configured to determine the first summary record associated with the first MP node 116A based on at least one of an aggregation of a transaction amount associated with each of the extracted first set of transaction records. For example, the first MP node 116A may determine a sum of a transaction amount or a transaction value of each of the extracted first set of transactions and determine the first summary record based on the determined sum. In an embodiment, the first summary record may indicate a total transaction amount of the extracted first set of transactions. In an embodiment, the determination of the first summary record associated with the first MP node 116A may be further based on the first set of parameters. Details related to the first set of parameters are provided, for example, in FIG. 2 (at 208). In another embodiment, the first MP node 116A may be configured to transmit the extracted first set of transaction records to the first MaaS node 118A. The first MaaS node 118A may be configured to determine the first summary record associated with the first MP node 116A based on at least one of an aggregation of a transaction amount associated with each of the received first set of transaction records. For example, in case the number of transaction records are less than a certain value (such as, a few hundred), the first MP node 116A may transmit the transaction records to the first MaaS node 118A and the first MaaS node 118A may determine the first summary record.

At 410, the determined first summary record may be transmitted. In an embodiment, the first MP node 116A may be configured to transmit the determined first summary record associated with the first MP node 116A to the first MaaS node 118A. The first MaaS node 118A may receive the first summary record from the first MaaS node 118A.

At 412, a set of summary records associated with the first MP node 116A may be received. In an embodiment, the first MaaS node 118A may be configured to receive the set of summary records associated with the first MP node 116A from a set of MP nodes of the plurality of node packages 120. The set of summary records associated with the first MP node 116A may include at least the first summary record associated with the first MP node 116A.

At 414, a second summary record may be determined. In an embodiment, the first MaaS node 118A may be configured to determine the second summary record associated with the first MP node 116A based at least on an aggregation of a transaction amount associated with each of the received set of summary records. For example, the first MaaS node 118A may aggregate the transaction amount associated with each of the received set of summary records to determine a total transaction amount of each of a plurality of transaction records associated with the first MP node 116A stored at the various node packages of the first MaaS network 102. In an embodiment, the second summary record may indicate the total transaction amount of each of the plurality of transaction records associated with the first MP node 116A stored at the various node packages of the first MaaS network 102.

At 416, a first revenue share may be determined. In an embodiment, the first MaaS node 118A may be configured to execute the first smart contract to determine the first revenue share associated with the first MP corresponding to the first MP node 116A based on the determined second summary record. For example, the first smart contract may include a revenue calculation logic associated with the terms and conditions and the service agreement between the first MP and first MaaS provider. Upon execution of the first smart contract for the determination of the first revenue share, the revenue calculation logic may be applied on the second summary record. The second summary record may include a total transaction amount of each transaction corresponding to the plurality of transactions records associated with the first MP node 116A. The total transaction amount may be used as an indicator of a revenue or royalty earned by the first MP to provide services to the customers through the first MaaS network 102 during a certain time frame or an accounting period.

In an embodiment, the determination of the first revenue share associated with the first MP may be further based on the second set of parameters. Details related to the second set of parameters are provided, for example, in FIG. 2 (at 216). In an embodiment, the determination of the first revenue share associated with the first MP may be further based on an application of the AI system 146 on at least one of the determined second summary record or the second set of parameters. The AI system 146 may be pre-trained on a revenue share determination task. In an embodiment, the AI system 146 may be trained based on the revenue model, the service agreement, the terms or service, and/or the privacy policy. The first MaaS node 118A may feed the determined second summary record and/or the second set of parameters to the AI system 146. The AI system 146 may determine the first revenue share associated with the first MP based on the fed second summary record and/or the second set of parameters. The determination of the first revenue share associated with the first MP is described further, for example, in FIG. 2 (at 216).

At 418, the determined first revenue share may be transmitted. In an embodiment, the first MaaS node 118A may be configured to transmit the determined first revenue share associated with the first MP to the first MP node 116A. The first MP node 116A may receive the determined first revenue share from the first MaaS node 118A.

At 420, the first revenue share may be stored. In an embodiment, the first MaaS node 118A may be configured to store the first revenue share associated with the first MP. In an embodiment, the first MP node 116A may verify the determined first revenue share based on a plurality of transaction records stored on the first MP node 116A. Herein, the plurality of transaction records may include at least the first set of transaction records. The first MP node 116A may transmit a result of the verification as first verification information to the first MaaS node 118A. The first MaaS node 118A may further cross-verify the verified first revenue share based on the first verification information and the first set of transaction records stored on the first MaaS node 118A. The first MaaS node 118A may be configured to store the cross-verified first revenue share in the first MaaS node 118A. In an embodiment, the first revenue share may also be stored on the first MP node 116A. The verification of the first revenue share is described further, for example, in FIG. 3 (from 304 to 320). The storage of the first revenue share is described further, for example, in FIG. 2 (at 220).

In an embodiment, the first MaaS node 118A may transmit the first revenue share associated with the first MP to the analytics node 122A. The analytics node 122A may also store the first revenue share associated with the first MP. Also, the analytics node 122A may transmit the first revenue share to the archival database node 124 for long-term storage based on a data retention threshold (e.g., one month) associated with the analytics node 122A and a storage duration of the first revenue share on the analytics node 122A. The archival database node 124 may store the first revenue share once the storage duration of the first revenue share on the analytics node 122A exceeds the data retention threshold associated with the analytics node 122A.

In an embodiment, the determination of the first revenue share, as described, for example, in FIG. 4, may be beneficial and advantageous where a number of the first set of transaction records is not very large. Examples of such scenario may be when the first set of transaction records correspond to a small-scale transaction set (such as, less than or up to a few hundred transaction records) or a medium-scale transaction set (such as, a less than or up to a few thousand transaction records). In such scenario, the first revenue share may be determined by one or more distributed ledger nodes of the first MaaS network 102. For example, as described in FIG. 4, the first MP node 116A and the first MaaS node 118A may be involved in the determination of the first revenue share. In such case, the system 126 may be omitted from the network environment 100 (of FIG. 1) or may not be involved in the determination of the first revenue, even if present in the network environment 100. The processing of the first set of transaction records on the one or more distributed ledger nodes for the determination of the first revenue share may be advantageous as there may be no data privacy concerns. Also, since the number of transactions may be less, the one or more distributed ledger nodes may be able to process the first set of transaction records efficiently. The first set of transaction records may not be required to be offloaded in such case, as transaction record offloading may not achieve any efficiency gains as processing of small-scale or medium-scale transaction set on the one or more distributed ledger nodes may be equally efficient.

Figure 5:
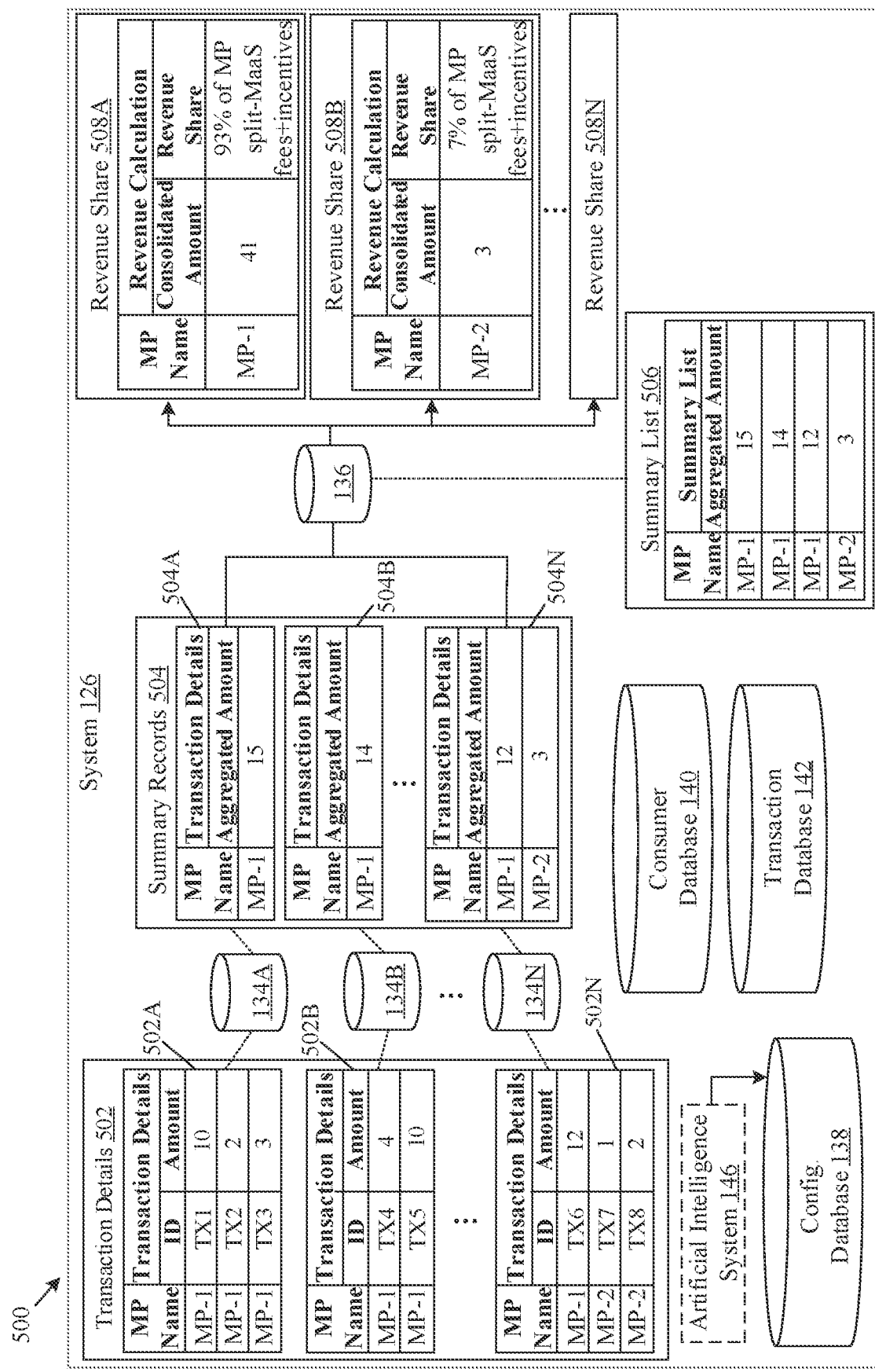
FIG. 5 is an exemplary scenario that depicts determination of a first revenue share associated with a first mobility provider (MP) corresponding to a first MP node of FIG. 1, in accordance with an embodiment of the disclosure.

FIG. 5 is an exemplary scenario that depicts determination of a first revenue share associated with a first mobility provider (MP) corresponding to a first MP node of FIG. 1, in accordance with an embodiment of the disclosure. FIG. 5 is explained in conjunction with elements from FIGS. 1, 2, 3, and 4. With reference to FIG. 5, there is shown an exemplary scenario 500. The scenario 500 depicts determination of the first revenue share associated with the first MP corresponding to the first MP node 116A by the system 126.

The system 126 may include the plurality of aggregator nodes 134 (for example, the first aggregator node 134A, the second aggregator node 134B, . . . and the Nth aggregator node 134N), the central MaaS node 136, the configuration database 138, the consumer database 140, and the transaction database 142. The scenario 500 may further depict the AI system 146. The scenario 500 further depicts transaction details 502 including a set of transaction records 502A received at the first aggregator node 134A, a set of transaction records 502B received at the second aggregator node 134B, . . . and a set of transaction records 502N received at the Nth aggregator node 134N. The scenario 500 further depicts summary records 504 including a summary record 504A determined at the first aggregator node 134A, a summary record 504B determined at the second aggregator node 134B, . . . and a summary record 504N determined at the Nth aggregator node 134N. The scenario 500 further depicts a summary list 506 determined at the central MaaS node 136. Further, the scenario 500 depicts a revenue share 508A associated with a first MP corresponding to the first MP node 116A, a revenue share 508B associated with a second MP corresponding to the second MP node 116B, . . . and a revenue share 508N associated with an Nth MP corresponding to the Nth MP node 116N. The central MaaS node 136 may be configured to determine the revenue share 508A, the revenue share 508B, . . . and the revenue share 508N.

The consumer database 140 may be configured to store mobility provider data associated with each mobility provider associated with the first MaaS network 102. For example, the mobility provider data associated with the first MP may include data ownership details related to the first MP, a service contract between the first MP and a first MaaS player corresponding to the first MaaS node 118A, terms or service associated with the service contract, a privacy policy associated with the service contract, a process service associated with the service contract, and/or a revenue model associated with the first MP and the first MaaS player. The transaction database 142 may be configured to store transaction records associated with each of the plurality of MP nodes 116A, 116B, . . . and 116N received from the plurality of MaaS nodes 118A, 118B, . . . and 118N of the plurality of node packages 120. For example, the transaction database 142 may store the transaction details 502. In an embodiment, the transaction database 142 may receive the set of transaction records 502A from the first MaaS node 118A, based on a trigger event associated with the first node package 120A. The transaction database 142 may store the received set of transaction records 502A along with other transaction records (e.g., the transaction details 502). The transaction database 142 may transmit the received set of transaction records 502A to the first aggregator node 134A for processing.

In an embodiment, the first aggregator node 134A may be configured to receive the set of transaction records 502A from the first MaaS node 118A of the first node package 120A, based on the trigger event associated with the first node package 120A. Herein, one or more MP nodes of the first node package 120A may include the first MP node 116A. For example, each of the set of transaction records 502A may be associated with a first mobility provider "MP-1" corresponding to the first MP node 116A. The set of transaction records 502A may include a first transaction record with an identifier (ID) as "TX1" and a transaction amount as "10", a second transaction record with an ID as "TX2" and a transaction amount as "2", and a third transaction record with an ID as "TX3" and a transaction amount as "3". Similarly, the second aggregator node 134B may be configured to receive the set of transaction records 502B from the second MaaS node 118B of the second node package 120B, based on a trigger event associated with the second node package 120B. Herein, one or more MP nodes of the second node package 120B may also include the first MP node 116A. For example, each of the set of transaction records 502B may be associated with the first mobility provider "MP-1" corresponding to the first MP node 116A. The set of transaction records 502B may include a fourth transaction record with an ID as "TX4" and a transaction amount as "4", and a fifth transaction record with an ID as "TX5" and a transaction amount as "10". Further, the Nth aggregator node 134N may be configured to receive the set of transaction records 502N from the Nth MaaS node 118N of the Nth node package 120N, based on a trigger event associated with the Nth node package 120N. Herein, one or more MP nodes of the Nth node package 120N may include the first MP node 116A and the second MP node 116B. For example, the set of transaction records 502N may include a sixth transaction record with an ID as "TX6" and a transaction amount as "12", seventh transaction record with an ID as "TX7" and a transaction amount as "1", and an eighth transaction record with an ID as "TX8" and a transaction amount as "2". The sixth transaction record may be associated with the first mobility provider "MP-1" corresponding to the first MP node 116A. Further, the seventh transaction record and the eighth transaction record may be both associated with a second mobility provider "MP-2" corresponding to the second MP node 116B.

The N number of aggregator nodes shown in FIG. 5 is presented merely as an example. The plurality of aggregator nodes 134 may include only two or more than N aggregator nodes for the determination of the first revenue share associated with the first MP, without deviation from the scope of the disclosure. Further, the transaction details 502 of the scenario 500 is explained with reference to three sets of transaction records including the set of transaction records 502A, the set of transaction records 502B, and the set of transaction records 502N, for the sake of brevity. Though, transaction detail 502 may include only two or more than three (or more than N) sets of transaction records, without departure from the scope of the disclosure.

In an embodiment, each of the plurality of aggregator nodes 134 may be configured to determine a summary record based on an aggregation of a transaction amount associated with each of a corresponding set of transaction records received by the respective aggregator node. For example, the first aggregator node 134A may be configured to determine the summary record 504A (i.e., the first summary record of FIG. 2) associated with the first MP "MP-1" corresponding to the first MP node 116A. The determination of the summary record 504A may be based at least on an aggregation of a transaction amount of each of the set of transaction records 502A (i.e., the first set of transaction records of FIG. 2). In an example, an aggregated transaction amount associated with the summary record 504A may be "15" (i.e., 10+2+3), based on the sum of the transaction amounts of the first transaction record "TX1", the second transaction record "TX2", and the third transaction record "TX3". The determination of the first summary record associated with the first MP node 116A by the first aggregator node 134A, is described further, for example, in FIG. 2. Similarly, the second aggregator node 134B may determine the summary record 504B including an aggregated transaction amount as "14" for the first MP "MP-1". Further, the Nth aggregator node 134N may determine the summary record 504N including an aggregated transaction amount as "12" for the first MP "MP-1" and also including an aggregated transaction amount as "3" for the second MP "MP-2".

In an embodiment, the central MaaS node 136 may be configured to receive a set of summary records from the plurality of aggregator nodes 134. In an embodiment, the received set of summary records includes at least the summary record 504A. For example, the set of summary records received by the central MaaS node 136 may include the summary record 504A received from the first aggregator node 134A, the summary record 504B received from the second aggregator node 134B, and the summary record 504N received from the Nth aggregator node 134N. The central MaaS node 136 may determine the summary list 506 based on the received set of summary records. For example, the summary list 506 may include first set of summary information associated with the first MP "MP-1" and second set of summary information associated with the second MP "MP-2". The first set of summary information may include a first record with an aggregated amount as "15", a second record with an aggregated amount as "14", and a third record with an aggregated amount as "12". Further, the second set of summary information may include a fourth record with an aggregated amount as "3".

In an embodiment, the central MaaS node 136 may be configured to determine a second summary record associated with the first MP node 116A, based at least on an aggregation of a transaction amount associated with each of the received set of summary records. For example, the central MaaS node 136 may determine the second summary record associated with the first MP node 116A based on the first set of summary information in the summary list 506. A consolidated amount associated with the second summary record associated with the first MP node 116A may be "41" (i.e., 15+14+12). The determination of the second summary record associated with the first MP node 116A is described further, for example, in FIG. 2. Similarly, the central MaaS node 136 may determine a second summary record associated with the second MP node 116B and a second summary record associated with the Nth MP node 116N. For example, a consolidated amount associated with the second summary record associated with the second MP node 116B may be "3" (as the aggregated amount of the fourth record in the second set of summary information, in the summary list 506, is "3").

In an embodiment, the central MaaS node 136 may be configured to determine the revenue share 508A (i.e., the first revenue share of FIG. 2) associated with the first MP "MP-1" corresponding to the first MP node 116A based on the determined second summary record associated with the first MP node 116A. For example, the central MaaS node 136 may determine a first ratio (denoted by R1) of the consolidated amount associated with the second summary record associated with the first MP node 116A to a sum of a consolidated amount associated with a respective second summary record associated with each MP node of the plurality of MP nodes 116A, 116B, . . . 116N. As shown in FIG. 5, the first ratio (i.e., R1) may be determined as 41/(41+3), i.e., 0.93 (or 93%). The central MaaS node 136 may determine the revenue share 508A associated with the first MP "MP-1" by use of following equation (1):

$$\text{Revenue Share} = R_1 \cdot (MP \text{ split}) - \text{MaaS fees} + \text{incentives} \quad (1)$$

where,
MP split may represent a total revenue of all mobility providers;
MaaS fees may represent fees chargeable by a MaaS player; and
incentives may represent incentives earned by an MP for various green initiatives.

The determination of the first revenue share (i.e., the revenue share 508A) associated with the first MP may be further based on the second set of parameters. In an embodiment, the central MaaS node 136 may be configured to determine the second set of parameters based on the trends of changes of the values of the set of impact factors associated with the first MP. The trends of changes of the values of the set of impact factors associated with the first MP may be monitored periodically (for example, at the end of each day) by the monitor node 122B and transmitted to the central MaaS node 136. In an embodiment, the determination of the first revenue share associated with the first MP may be based on an application of the AI system 146 (for example, the AI Model 812D of FIG. 8) on at least one of the determined second summary record associated with the first MP node 116A or the second set of parameters. The AI system 146 may be pre-trained on a revenue share determination task. In an embodiment, the AI system 146 may be trained based on the configuration data associated with the first MP stored on the configuration database 138, the revenue model, the service agreement, the terms or service, and/or the privacy policy. The central MaaS node 136 may feed the determined second summary record and/or the second set of parameters to the AI system 146. The AI system 146 may determine the first revenue share associated with the first MP based on the fed second summary record and/or the second set of parameters.

In an embodiment, the AI system 146 may be further trained on an environmental impact analysis task. In an embodiment, the AI system 146 may determine a score for the trends of changes of the values of each of the set of impact factors associated with the first MP. Based on the determined score, the AI system 146 may predict a future change in values of the set of impact factors associated with the first MP. The predicted future changes in the values of the set of impact factors may be indicative of a future environmental impact of an operation of the first MP. The central MaaS node 136 may update the determined first revenue share associated with the first MP based on the predicted change in the values of the set of impact factors associated with the first MP.

The central MaaS node 136 may periodically update the configuration data associated with the first MP stored on the configuration database 138 based on the prediction of a new future environmental impact of an operation of the first MP at the end of a periodic interval (e.g., at the end of each day) by the AI system 146. The monitor node 122B may then use the updated configuration data to monitor new values for the set of impact factors associated with the first MP at the end of the periodic interval. Further, the central MaaS node 136 may determine new values for the second set of parameters based on the newly monitored values of the set of impact factors. The central MaaS node 136 may determine the first revenue share associated with the first MP by use of the AI system 146 based on the new values of the second set of parameters. The determination of the first revenue share associated with the first MP is described further, for example, in FIG. 2. Similarly, the central MaaS node 136 may determine the revenue share 508B associated with the second MP "MP-2" corresponding to the second MP node 116B and the revenue share 508N associated with the Nth MP corresponding to the Nth MP node 116N. For example, based on the use of equation (1), the revenue share 508B may be determined as 7% of MP split–MaaS fees+incentives. The scenario 500 of FIG. 5 is for exemplary purpose and should not be construed as limiting the scope of the disclosure.

Figure 6:
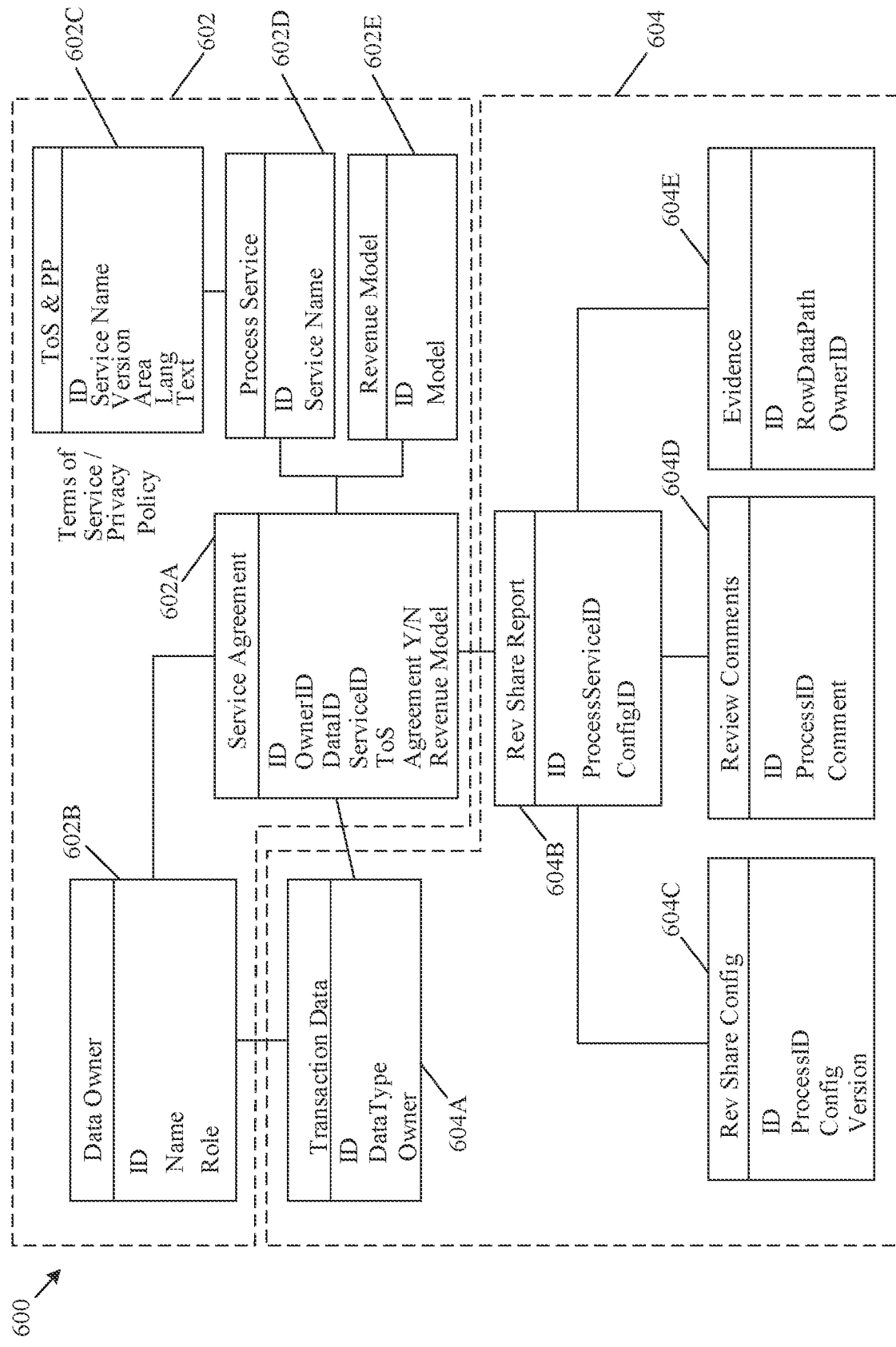
FIG. 6 is a diagram that illustrates an exemplary entity-relationship (ER) diagram associated with on-boarding of a mobility provider (MP) node to a node package of a Mobility-as-a-Service (MaaS) platform with a common database architecture and determination of a revenue share of a mobility provider corresponding to the MP node, in accordance with an embodiment of the disclosure.

FIG. 6 is a diagram that illustrates an exemplary entity-relationship (ER) diagram associated with on-boarding of a mobility provider (MP) node to a node package of a Mobility-as-a-Service (MaaS) platform with a common database architecture and determination of a revenue share of a mobility provider corresponding to the MP node, in accordance with an embodiment of the disclosure. FIG. 6 is explained in conjunction with elements from FIGS. 1, 2, 3, 4, and 5.

With reference to FIG. 6, there is shown an exemplary ER diagram 600. The ER diagram 600 may include a plurality of entities related to one another based on a relationship. Each of the plurality of entities may be a data structure such as, but not limited to, a class, a structure, an object, a relational-table, or any data structure capable to represent an entity. The ER diagram 600 may include a first set of entities 602 and a second set of entities 604. The first set of entities 602 may be associated with the on-boarding of the first MP node 116A to the first node package 120A, as described further, for example, in FIG. 2. The second set of entities 604 may be associated with determination of the first revenue share associated with the first MP corresponding to the first MP node 116A, as described further, for example, in FIG. 2.

The first set of entities 602 may include a first entity 602A, a second entity 602B, a third entity 602C, a fourth entity 602D, and a fifth entity 602E. The first entity 602A may be associated with the second entity 602B, the fourth entity 602D, and the fifth entity 602E. Further, the fourth entity 602D may be associated with the third entity 602C. The first entity 602A may be associated with a "Service Agreement" between the first MP and the first MaaS player. The first entity 602A may have attributes such as, but not limited to, an identifier (ID), an Owner ID, a Data ID, a Service ID, Terms of Service (ToS), Agreement Y/N (Yes/No), and a Revenue Model. The second entity 602B may be associated with a "Data Owner" (i.e., the first MP) and may have attributes such as, but not limited to, an ID, a Name, and a Role. The third entity 602C may be associated with "Terms of Service (ToS) and Privacy Policy (PP)" between the first MP and the first MaaS player. The third entity 602C may have attributes such as, but not limited to, an ID, a Service Name, a Version, an Area, a Language (Lang.), and a Text (i.e., text of ToS). The fourth entity 602D may be associated with a "Process Service" corresponding to business processes between the first MP and the first MaaS player. The fourth entity 602D may have attributes such as, but not limited to, an ID and a Service Name. The fifth entity 602E may be associated with a "Revenue Model" associated with a revenue sharing between the first MP and the first MaaS player. The fifth entity 602E may have attributes such as, but not limited to, an ID and a Model. Details related to exemplary database tables that may be defined based on each of the first set of entities 602 are provided in Table 1, as follows:

TABLE 1

Exemplary database tables that may be defined from the first set of entities 602.

| Table Name | Column name | Description |
| --- | --- | --- |
| Data Owner | ID | Unique ID - Primary key |
|  | Name | Name of Owner/Company |
|  | Role | Mobility Provider, or MaaS Player |
| Process Service | ID | Unique ID - Primary key |
|  | Service Name | Service name provided by MP (City Cab, etc.) |
| Tos & PP (Terms of service & Privacy policy) | ID | Unique ID - Primary key |
|  | Service Name | (Foreign key) Reference to Service name provided by MP |
|  | Version | Version number of Terms |
|  | Area | Location information |
|  | Lang | Language |
|  | Text | Textual representation of conditions under Tos & PP |

TABLE 1-continued

Exemplary database tables that may be defined from the first set of entities 602.

| Table Name | Column name | Description |
|---|---|---|
| Service Agreement (Contract between MaaS & MP) | ID | Unique ID - Primary key |
| | OwnerID | Reference to Mobility Provider |
| | DataID | Type of transaction (Ex: Ticket, Subscription, etc.) |
| | ServiceID | Reference to Process Service (Service name provided by MP) |
| | Tos | Reference to Tos & PP |
| | Agreement Y/N | Status of agreement - Accepted/ Pending/Approved, etc |
| | Revenue Model | Reference to Revenue Model |
| Revenue Model | ID | Unique ID - Primary key |
| | Model | Revenue Model negotiated between MP and MaaS player |

For example, with reference to Table 1, the table "Data Owner" may be defined for the second entity 602B. Further, the table "Process Service" may be defined for the fourth entity 602D. Moreover, the tables "Tos & PP" and "Service Agreement" may be defined for the first entity 602A and the third entity 602C, respectively. Further, the table "Revenue Model" may be defined for the fifth entity 602E. It should be noted that data provided in Table 1 may merely be taken as experimental data and may not be construed as limiting the present disclosure.

The second set of entities 604 may include a first entity 604A, a second entity 604B, a third entity 604C, a fourth entity 604D, and a fifth entity 604E. The first entity 604A may be associated with the second entity 602B and the first entity 602A of the first set of entities 602. Further, the second entity 604B may be associated with the first entity 602A of the first set of entities 602, and may also be associated with the third entity 604C, the fourth entity 604D, and the fifth entity 604E of the second set of entities 604. The first entity 604A may be associated with "Transaction Data" associated with the first MP and may have attributes such as, but not limited to, an ID, a Data Type, and an Owner. The second entity 604B may be associated with a "Revenue (Rev.) Share Report" associated with the first MP and may have attributes such as, but not limited to, an ID, a Process Service ID, and a Configuration (Config.) ID. The third entity 604C may be associated with "Revenue (Rev.) Share Configuration (Config.)" associated with the first MP and may have attributes such as, but not limited to, an ID, a Process ID, a Config., and a Version. The fourth entity 604D may be associated with a "Review Comments" associated with a verification of the Revenue Share Report (i.e., the second entity 604B) by one or more of the first MP node 116A and the first MaaS node 118A. The fourth entity 604D may have attributes such as, but not limited to, an ID, a Process ID, and a Comment. The fifth entity 604E may be associated with an "Evidence" associated with a revenue share determined for the first MP. The fifth entity 604E may have attributes such as, but not limited to, an ID, a Row Data Path, and an Owner ID. Details related to exemplary database tables that may be defined based on each of the second set of entities 604 are provided in Table 2, as follows:

TABLE 2

Exemplary database tables that may be defined from the second set of entities 604.

| Table | Column name | Description |
|---|---|---|
| Transaction Data | ID | Unique ID - Primary key |
| | DataType | Reference to Type of transaction |
| | Owner | Reference to Transaction Owner (MP) |
| Rev Share Config (Conditions for revenue share) | ID | Unique ID - Primary key |
| | Process ID | Reference to Process Service (Service name provided by MP) |
| | Config | Conditions of revenue share (Ex: 10% share, etc.) |
| | Version | Version number to track basis of revenue share calculation |
| Rev Share Report | ID | Unique ID - Primary key |
| | Process ServiceID | Reference to Service Agreement (which internally connects Process & Service agreement) |
| | ConfigID | Reference to Conditions of revenue share |
| | ID | Unique ID - Primary key |
| ReviewComments (Comments captured from MP & MaaS part of Revenue sharing settlement workflow) | ProcessID | Reference to Process Service (Service name provided by MP) |
| | Comment | Actual comment text provided by MP/MaaS as part of each workflow step |
| Evidence | ID | Unique ID - Primary key |
| | RowDataPath | Path to evidence data, if stored on file server or other location outside database |
| | OwnerID | Reference to Mobility Provider |

For example, with reference to Table 2, the table "Transaction Data" may be defined for the first entity 604A. Further, the table "Rev Share Config" may be defined for the third entity 604C. Moreover, the tables "Rev Share Report" and "ReviewComments" may be defined for the second entity 604B and the fourth entity 604D, respectively. Further, the table "Evidence" may be defined for the fifth entity 604E. It should be noted that data provided in Table 2 may merely be taken as experimental data and may not be construed as limiting the present disclosure.

In an embodiment, the first MP node 116A may be on-boarded to the first node package 120A and may be associated with the first MaaS network 102 and the system 126 based on one or more of, but not limited to, a service agreement (based on the first entity 602A), a data ownership agreement (based on the second entity 602B), a ToS & PP (based on the third entity 602C), a business process service model (based on the fourth entity 602D), and a revenue model (based on the fifth entity 602E). Once the first MP node 116A is on-boarded, the first set of transaction records of the first MP node 116A, that may be stored on the first MaaS node 118A, may be transmitted to the first aggregator node 134A of the system 126, based on a trigger event. The second entity 604B may be used to capture transaction data (i.e., transaction records representative of ticket usage) in blockchain database nodes (such as, the first MP node 116A and the first MaaS node 118A) and cache database node 126 or the system 126. The system 126 may apply a revenue share determination logic to determine the first revenue share associated with the first MP. The system 126 may determine a revenue share report associated with the determined first revenue share based on the first entity 604A. For example, the central MaaS node 136 may determine the first revenue share associated with the first MP based on one or more of, but not limited to, the revenue model (based on the fifth entity 602E), the ToS & PP (based on the third entity 602C), and the Service Agreement (based on the first entity 602A). The central MaaS node 136 may also use the AI system 146 to determine the first revenue share based on the revenue model and the ToS & PP clauses. Once the first revenue share is determined, the first MP node 116A and/or the first MaaS node 118A may verify the determined first revenue share and provide comments on the verified first revenue share, based on the fourth entity 604D. The verified first revenue share result may be stored on one or more blockchain database node (such as, the first MP node 116A and the first MaaS node 118A), based on the fifth entity 604E. It may be noted that the ER diagram 600 of FIG. 6 is for exemplary purpose and should not be construed as limiting the scope of the disclosure.

Figure 7:
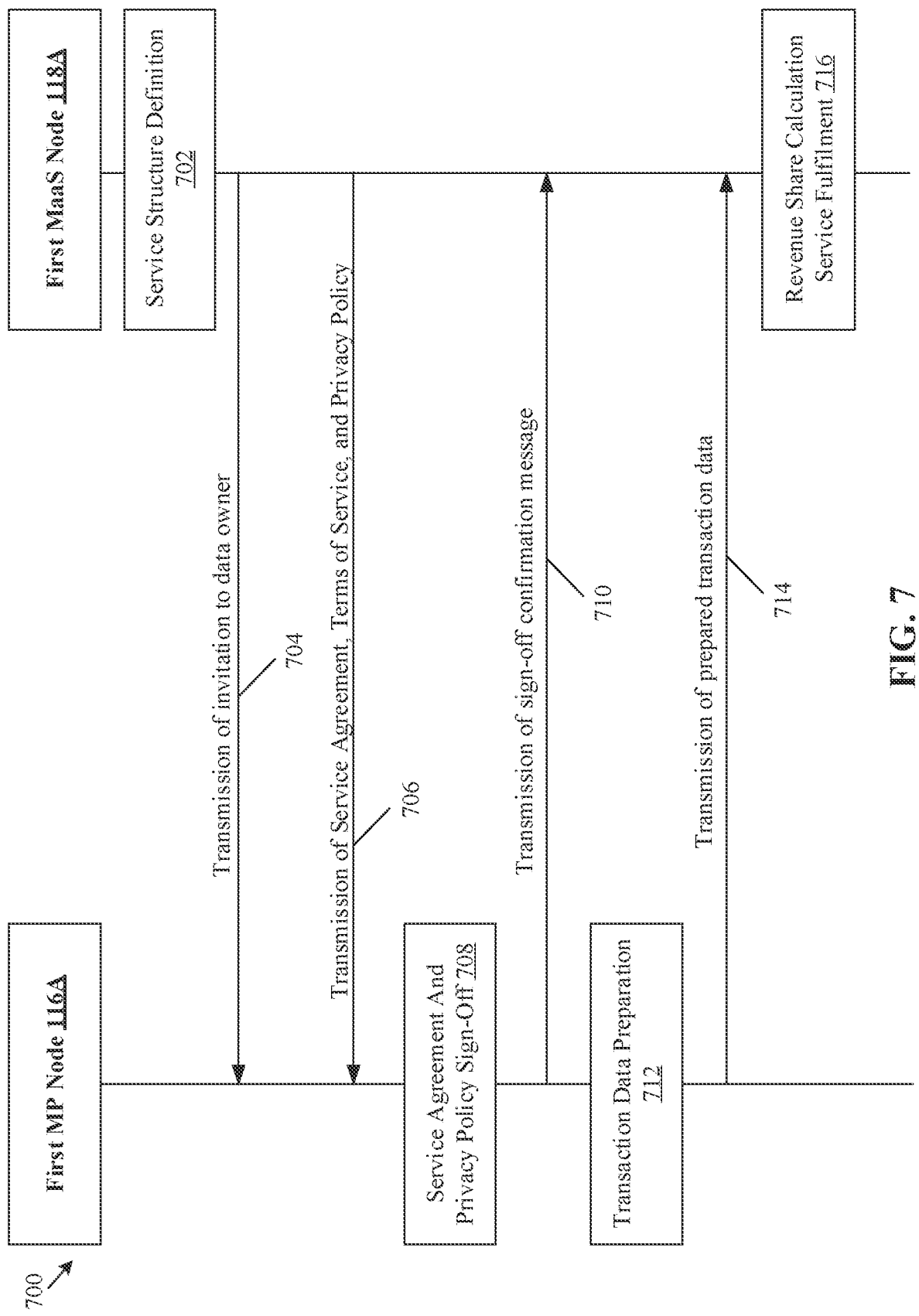
FIG. 7 is an exemplary sequence diagram that depicts an on-boarding process of a mobility provider (MP) node to a node package of a Mobility-as-a-Service (MaaS) platform with a common database architecture, in accordance with an embodiment of the disclosure.

FIG. 7 is an exemplary sequence diagram that depicts an on-boarding process of a mobility provider (MP) node to a node package of a Mobility-as-a-Service (MaaS) platform with a common database architecture, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a sequence diagram 700 that illustrates a sequence of operations from 702 to 716. The sequence of operations may be executed by various nodes of the first MaaS network 102 (such as, the first MP node 116A, and the first MaaS node 118A) of FIG. 1.

At 702, a service structure may be defined. In an embodiment, for the on-boarding of the first MP node 116A of the first MP to the first node package 120A, the first MaaS node 118A may be configured to define the service structure for the on-boarding process. To define the service structure, the first MaaS node 118A may generate configuration data for the first MP node 116A. For example, the generated configuration data may include a "Process Service" entity definition that may include attributes, such as, an identifier (ID) and a Service Name. In an example, the process service entity may include a "Revenue Share Report Service", which may be used for revenue calculation of the first MP associated with the first MP node 116A. Other services may also be defined. For example, a traffic jam analysis service for a government, a rewards calculation service for low carbon emission for mobility providers, and the like. The generated configuration data may further include text of "Terms of Service" and "Privacy Policy" for the "Process Service". The definition of the service structure may include a set-up of an executable environment for the "Process Service". Also, the definition of the service structure may include definition of on-boarding data that may belong to a data owner (for example, the first MP node 116A, in this case).

At 704, an invitation message may be transmitted to the data owner. In an embodiment, the first MaaS node 118A may be configured to transmit the invitation message to the data owner. Herein, the data owner may be the first MP node 116A. Thus, the invitation message may be transmitted to the first MP node 116A based on the defined service structure. The invitation message may indicate that the configuration data for the on-boarding of the first MP node 116A may be generated and the on-boarding process for the first MP node 116A has been initiated. The invitation message may be received by the first MP node 116A.

At 706, one or more of the service agreement, the terms of service of the service agreement, and the privacy policy may be transmitted. In an embodiment, the first MaaS node 118A may be configured to transmit one or more of the service agreement, the terms of service of the service agreement, and the privacy policy to the first MP node 116A (i.e. data owner). The first MP node 116A may be configured to receive the transmitted service agreement, the terms of service, and the privacy policy.

At 708, a service agreement and privacy policy sign-off operation may be executed. In an embodiment, the first MP node 116A (i.e. data owner) may be configured to execute the service agreement and privacy policy sign-off operation. The first MP node 116A may verify the service agreement, the terms of service, and the privacy policy with a set of business rules associated with the first MP. Based on the verification, if it is determined that the service agreement, the terms of service, and the privacy policy satisfy the set of business rules, the first MP node 116A may accept the service agreement and the privacy policy. The first MP node 116A may indicate the acceptance based on a sign-off to each of the service agreement and the privacy policy. The sign-off may form a legally-binding contract between the first MP and the first MaaS player. The jurisdiction of the contract may be based on a place of operation of the first MP, a place of operation of the MaaS player, or a place of operations/headquarters associated with the first MaaS network 102.

At 710, a sign-off confirmation message may be transmitted. In an embodiment, the first MP node 116A may be configured to transmit the sign-off confirmation message to the first MaaS node 118A. The sign-off confirmation message may indicate that the first MP node 116A has accepted to the service agreement, the terms or service, and the privacy policy. Also, the sign-off confirmation message may indicate that based on the acceptance, the first MP node 116A has signed-off to each of the service agreement and the privacy policy. In an embodiment, based on the receipt of the sign-off confirmation message, the first MaaS node 118A may generate a smart contract between the first MP and the first MaaS player and store the smart contract on each of the first MP node 116A and the first MaaS node 118A. At this stage, the first MP node 116A may be on-boarded to the first MaaS network 102 (and the first node package 120A).

At 712, transaction data may be prepared. In an embodiment, the first MP node 116A may be configured to prepare transaction data for the calculation of the revenue share associated with the first MP. To prepare the transaction data, the first MP node 116A may extract a set of transaction records from the first MP node 116A, based on a trigger event associated with the first node package 120A. Thereafter, the first MP node 116A may remove unwanted information from each extracted transaction record. For example, the first MP node 116A may only retain transaction ID and transaction amount fields for each transaction record to participate in the "Revenue Share Report Service" process (i.e. for calculation of the revenue share of the first MP).

At 714, the prepared transaction data may be transmitted. In an embodiment, the first MP node 116A may be configured to transmit the prepared transaction data to the first MaaS node 118A. The first MaaS node 118A may receive the transmitted prepared transaction data. The reception of the prepared transaction data may be based on the trigger event associated with the first node package 120A.

At 716, a revenue share calculation service may be fulfilled. In an embodiment, the first MaaS node 118A may be configured to fulfill the revenue share calculation service. The first MaaS node 118A may ingest the transaction data received from the first MP node 116A and fulfill the target service (for example, the "Revenue Share Report Service" process) in line with the service agreement. The fulfillment of the target service may be on a periodic basis, for example, once a day (such as, at 11:59:59 PM) or based on the trigger event associated with the first node package 120A. Other defined services may also be fulfilled by the first MaaS node 118A. For example, the traffic jam analysis service for a government, the rewards calculation service for low carbon emission for mobility providers, and the like. The calculation of the revenue share of an MP is described further, for example, in FIGS. 2, 3, 4, and 5.

In certain scenarios, the data owner (e.g., the first MP associated with the first MP node 116A) associated with the service agreement may update the service agreement at a later point of time. For example, a user may be eliminated from the scope of the service agreement and the privacy policy. The first MaaS node 118A may accordingly change the scope of the target service(s) to be fulfilled based on the updated scope of the service agreement and the privacy policy. In some cases, the service agreement may be discontinued at a later point of time by the first MaaS player (associated with the first MaaS node 118A). In such case, the first MP node 116A may send, to the first MP node 116A, a message that may indicate that the service agreement may be now void and non-enforceable. Further, in certain cases, the service agreement may be partially discontinued or updated by the first MaaS player. The first MaaS node 118A may communicate the updated service agreement (and/or privacy policy) to the first MP node 116A. The first MP node 116A may verify the updated service agreement (and/or privacy policy) based on the set of business rules of the first MP and accordingly sign-off to the updated service agreement (and/or privacy policy). In an embodiment, the first MaaS node 118A, on the other hand, may check a permission-based rule set to enable or disable a data management policy function of the first MaaS network 102 based on the updated service agreement. The data management policy function may be based on a region or area of operation of the first MP, the first MaaS player, and/or the first MaaS network 102 as a whole. The data management policy function may also be dependent on one or more legal requirements of the region or area, which may change from time-to-time. In addition, data retention and processing rules may be governed by fine-grained parameters in the service agreement. Examples of the fine-grained parameters may include data retention period, data analytics policy, a policy for data disclosure to third parties, treatment of personally identifiable information (PII), data hashing, and the like.

Figure 8:
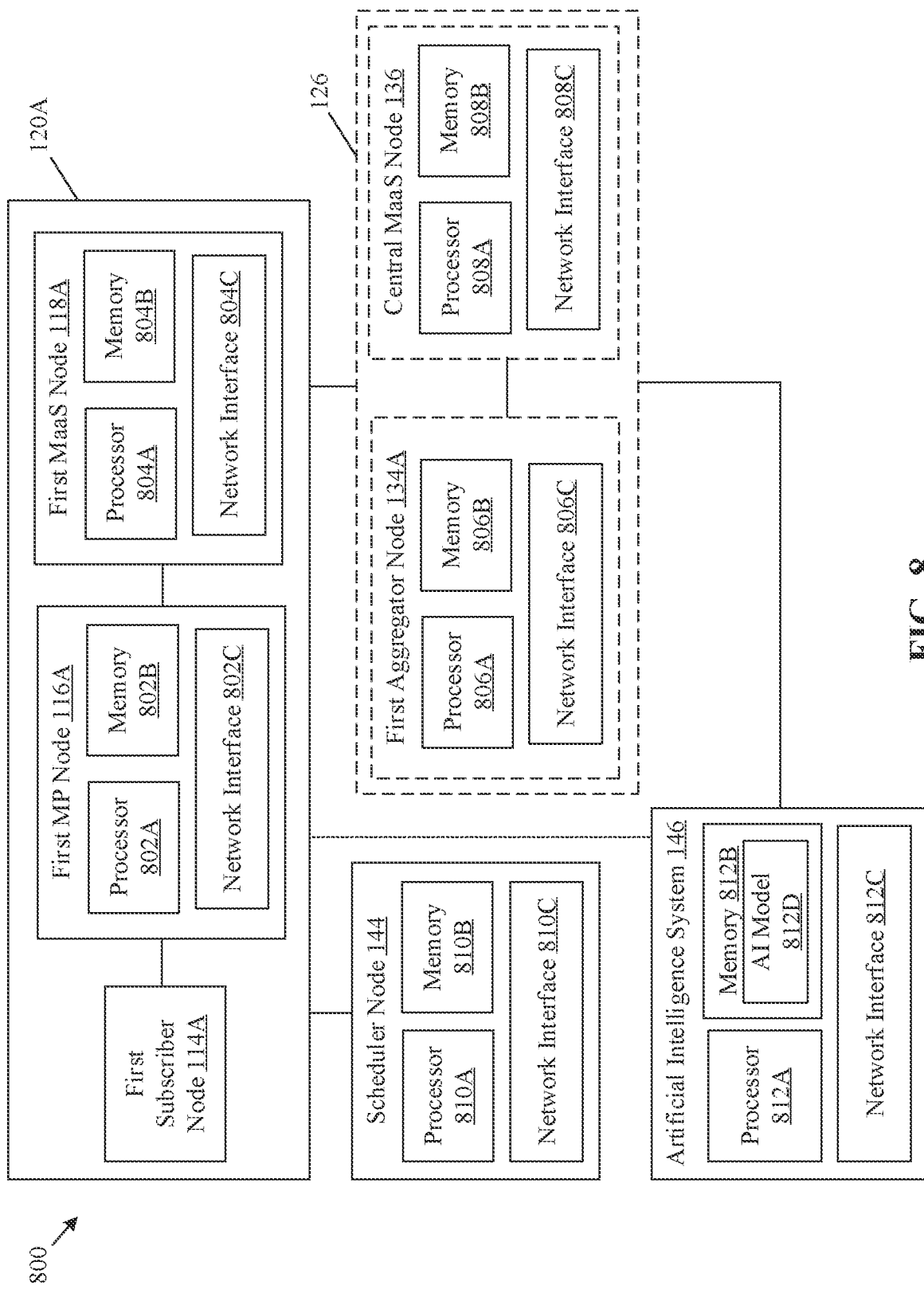
FIG. 8 is a block diagram of an exemplary system for revenue share determination for transactions on a mobility-as-a-service (MaaS) platform with a common database architecture, in accordance with an embodiment of the disclosure.

FIG. 8 is a block diagram of an exemplary system for revenue share determination for transactions on a mobility-as-a-service (MaaS) platform with a common database architecture, in accordance with an embodiment of the disclosure. FIG. 8 is explained in conjunction with elements from FIGS. 1, 2, 3, 4, 5, 6, and 7. With reference to FIG. 8, there is shown a block diagram of an exemplary system 800. The system 800 may include the first subscriber node 114A, the first MP node 116A, and the first MaaS node 118A, the scheduler node 144, the Artificial Intelligence (AI) system 146, the first aggregator node 134A, and the central MaaS node 136.

The first MP node 116A may include a processor 802A, a memory 802B, and a network interface 802C. The first MaaS node 118A may include a processor 804A, a memory 804B, and a network interface 804C. Moreover, the first aggregator node 134A may include a processor 806A, a memory 806B, and a network interface 806C. The central MaaS node 136 may further include a processor 808A, a memory 808B, and a network interface 808C. Further, the scheduler node 144 may include a processor 810A, a memory 8108, and a network interface 810C. In addition, the AI system 146 may include a processor 812A, a memory 812B, and a network interface 812C. Though not shown, the first subscriber node 114A may also include a processor, a memory, and a network interface.

The first subscriber node 114A, the first MP node 116A, and the first MaaS node 118A may form the first node package 120A of the plurality of node packages 120. The first MP node 116A may be communicatively coupled to the first subscriber node 114A and the first MaaS node 118A. The system 126 may include the first aggregator node 134A and the central MaaS node 136, both of which may be communicatively coupled to each other. The first node package 120A may be communicatively coupled to the system 126. For example, the first MaaS node 118A may be communicatively coupled to the first aggregator node 134A. Further, each of the scheduler node 144 and the AI system 146 may be communicatively coupled to the first node package 120A. The AI system 146 may also be communicatively coupled to the system 126. For example, the AI system 146 may be communicatively coupled to the central MaaS node 136. Though not shown, the AI system 146 may be communicatively coupled to the monitor node 1228.

The processor 804A may include suitable logic, circuitry, and/or interfaces that may be configured to execute a set of instructions stored in the memory 804B. The processor 804A may be configured to execute program instructions associated with different operations to be executed by the first MaaS node 118A or any other MaaS node. The processor 804A may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors. The functions of the processor 802A, the processor 806A, the processor 808A, the processor 810A, and the processor 812A may be same as the functions of the processor 804A of the first MaaS node 118A described, for example, in FIG. 1, 2, 3, 4, 5, or 7. Therefore, the description of processor 802A, the processor 806A, the processor 808A, the processor 810A, and the processor 812A is omitted from the disclosure for the sake of brevity.

The memory 804B may include suitable logic, circuitry, and/or interfaces that may be configured to store the one or more instructions to be executed by the processor 804A. The memory 804B may be configured to store the first set of transaction records and the determined first revenue share associated with the first MP. Examples of implementation of the memory 804B may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card. The functions of the memory 802B, the memory 806B, the memory 808B, the memory 810B, and the memory 812B may be same as the functions of the memory 804B described, for example, in FIG. 8. Therefore, the description of the memory 802B, the memory 806B, the memory 808B, the memory 810B, and the memory 812B is omitted from the disclosure for the sake of brevity.

The memory 812B of the AI system 146 may include an AI Model 812D that may be pre-trained to determine a revenue share (for example, the first revenue share) associated with an MP (for example, the first MP). The determination of the revenue share (for example, the first revenue share) may be based on an aggregated transaction amount of (e.g., based on the second summary record) each of a set of transaction records of an MP node (for example, the first MP node 116A) corresponding to the MP (for example, the first MP). The determination of first revenue share by application of the AI Model 812D on the aggregated transaction amount is described further, for example, in FIGS. 2 and 4. The AI Model 812D may be further trained on an environmental impact analysis task. In an embodiment, the AI Model 812D may determine a score for the trends of changes of the values of each of the set of impact factors associated with the MP (for example, the first MP). Based on the determined score, the AI Model 812D may predict a future change in values of the set of impact factors associated with the MP. The predicted future changes in the values of the set of impact factors may be indicative of a future environmental impact of an operation of the MP. Details related to the AI model are provided further, for example, in FIG. 1.

The network interface 804C may include suitable logic, circuitry, and interfaces that may be configured to facilitate communication between the corresponding processors of the first MP node 116A, the first MaaS node 118A, the system 126, the scheduler node 144, and the AI system 146, via a communication network (not shown in FIG. 8). The network interface 804C may be implemented by use of various known technologies to support wired or wireless communication of the first MaaS node 118A with the communication network. The network interface 804C may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 804C may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The functions of the network interface 802C, the network interface 806C, the network interface 808C, the network interface 810C, and the network interface 812C may be same as the functions of the network interface 804C described, for example, in FIG. 8. Therefore, the description of the network interface 802C, the network interface 806C, the network interface 808C, the network interface 810C, and the network interface 812C is omitted from the disclosure for the sake of brevity.

Figure 9:
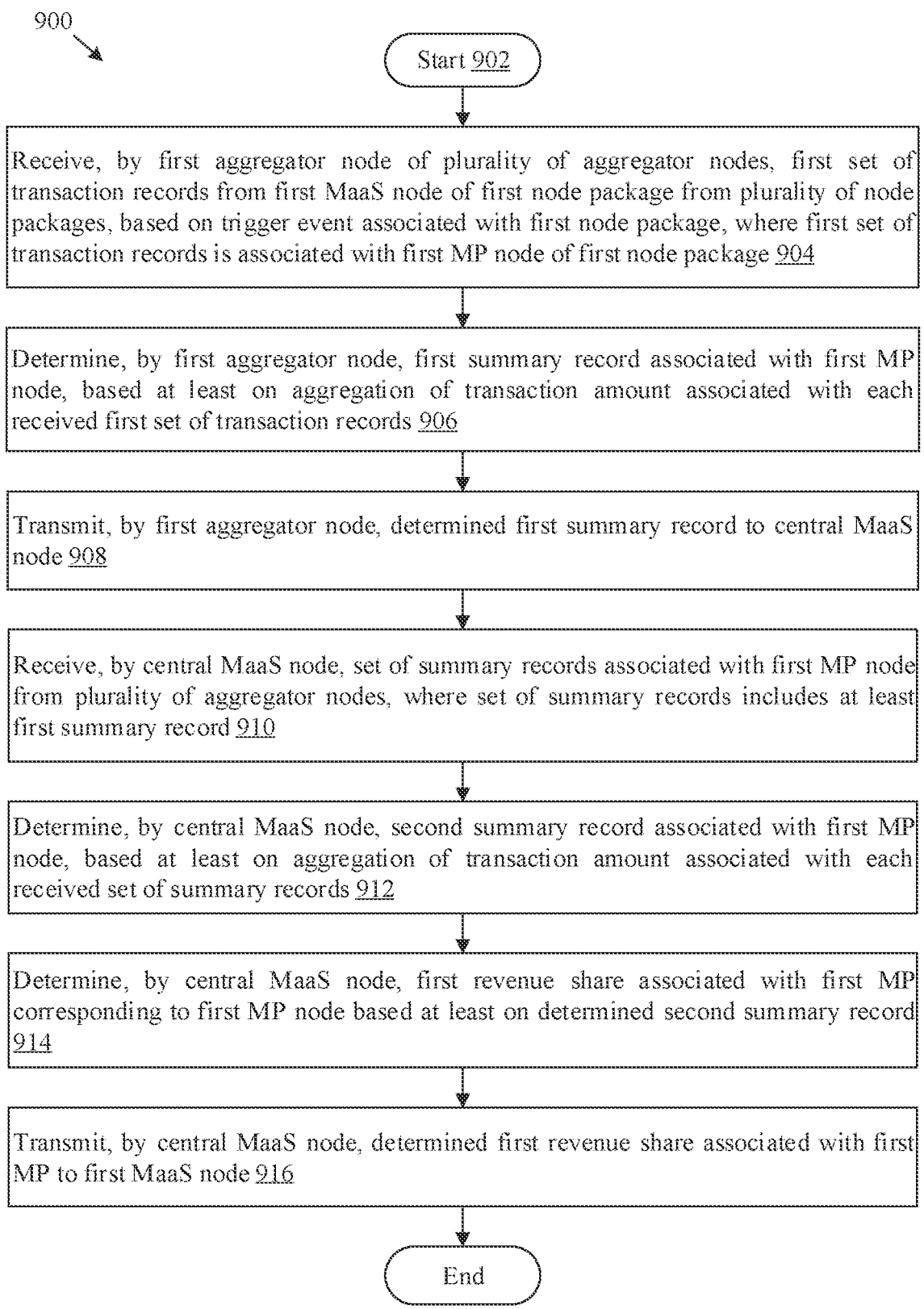
FIG. 9 illustrates an exemplary flowchart of a method for revenue share determination for large-scale transactions on a Mobility-as-a-Service (MaaS) platform with a common database architecture, in accordance with an embodiment of the disclosure.

FIG. 9 illustrates an exemplary flowchart of a method for revenue share determination for large-scale transactions on a Mobility-as-a-Service (MaaS) platform with a common database architecture, in accordance with an embodiment of the disclosure. FIG. 9 is described in conjunction with elements from FIGS. 1, 2, 3, 4, 5, 6, 7, and 8. With reference to FIG. 9, there is shown a flowchart 900. The exemplary method of the flowchart 900 may be executed by any computing system, for example, by the first MaaS node 118A or other Maas node of FIG. 1, the first aggregator node 134A or any other aggregator node of FIG. 1, and/or the central MaaS node 136 of FIG. 1. The exemplary method of the flowchart 900 may start at 902 and proceed to 904.

At 904, the first set of transaction records associated with the first MP node 116A of the first node package 120A may be received from the first MaaS node 118A of the first node package 120A, based on a trigger event associated with the first node package 120A. Each of the first set of transaction records may be associated with a transaction message received by the first subscriber node 114A of the first node package 120A of the plurality of node packages 120. In an embodiment, prior to the reception of the first set of transaction records, the first MP node 116A may be on-boarded to the first node package 120A of the first MaaS network 102 and/or the system 126. The on-boarding of the first MP node 116A is described further, for example, in FIG. 2. An ER diagram for the on-boarding of an MP node and revenue calculation for a mobility player associated with the MP node is described further, for example, in FIG. 6. A sequence operation for the on-boarding process for an MP node is described further, for example, in FIG. 7.

In another embodiment, the first MaaS network 102 may include a plurality of central MP nodes (not shown in FIG. 1). Each of the plurality of central MP nodes may be associated with a certain mobility provider and may be communicatively coupled to MP node(s) of the respective mobility provider. For example, a first central MP node may be associated with a first MP (and coupled to the first MP node 116A) and a second central MP node may be associated with a second MP (and coupled to the second MP node 116B). In some scenarios, each of multiple node packages may include an MP node associated with a single MP. In such cases, a single central MP node may be associated with each MP node (of that single MP), which may be included in such multiple node packages. In certain embodiments, the on-boarding process of an MP node may be executed by the central MP node associated with the MP node, which may be associated with the same mobility provider as the MP node.

In an embodiment, the processor 806A of the first aggregator node 134A of the plurality of aggregator nodes 134 may be configured to receive the first set of transaction records associated with the first MP node 116A from the first MaaS node 118A, based on the trigger event associated with the first node package 120A. The receipt of the first set of transaction records is described further, for example, in FIG. 2.

At 906, the first summary record associated with the first MP node 116A may be determined based at least on an aggregation of a transaction amount associated with each of the received first set of transactions. In an embodiment, the processor 806A of the first aggregator node 134A may be configured to determine the first summary record associated with the first MP node 116A, based at least on an aggregation of a transaction amount associated with each of the received first set of transaction records. For example, the processor 806A of the first aggregator node 134A may determine a sum of a transaction amount or a transaction value of each of the received first set of transactions and determine the first summary record based on the determined sum. The determination of the first summary record associated with the first MP node 116A is described further, for example, in FIGS. 2 and 5.

At 908, the determined first summary record may be transmitted to the central MaaS node 136. In an embodiment, the processor 806A of the first aggregator node 134A may be configured to transmit the determined first summary record associated with the first MP node 116A to the central MaaS node 136. The processor 808A of the central MaaS node 136 may be configured to receive the first summary record from the first aggregator node 134A.

At 910, the set of summary records associated with the first MP node 116A may be received from the plurality of aggregator nodes 134. The set of summary records may at least include the first summary record received from the first aggregator node 134A. In an embodiment, the processor 808A of the central MaaS node 136 may be configured to receive the set of summary records associated with the first MP node 116A from the plurality of aggregator nodes 134.

At 912, the second summary record associated with the first MP node 116A may be determined based at least on an aggregation of a transaction amount associated with each of the received set of summary records. In an embodiment, the processor 808A of the central MaaS node 136 may be configured to determine the second summary record associated with the first MP node 116A based at least on an aggregation of a transaction amount associated with each of the received set of summary records. For example, the processor 808A of the central MaaS node 136 may aggregate the transaction amount associated with each of the received set of summary records to determine a total transaction amount of each of a plurality of transaction records associated with the first MP node 116A stored at the various node packages of the first MaaS network 102. In an embodiment, the second summary record may indicate the total transaction amount of each of the plurality of transaction records associated with the first MP node 116A stored at the various node packages of the first MaaS network 102. The determination of the second summary record associated with the first MP node 116A is described further, for example, in FIGS. 2 and 5.

At 914, the first revenue share associated with the first MP corresponding to the first MP node 116A may be determined based on the determined second summary record. In an embodiment, the processor 808A of the central MaaS node 136 may be configured to determine the first revenue share associated with the first MP corresponding to the first MP node 116A based on the determined second summary record. For example, the second summary record may include a total transaction amount of each transaction corresponding to the plurality of transactions records associated with the first MP node 116A. The first revenue share associated with the first MP may be determined based on the total transaction amount. The total transaction amount may be used as an indicator of a revenue or royalty earned by the first MP to provide services to the customers through the first MaaS network 102 during a certain time frame or accounting period. In an embodiment, the determination of the first revenue share associated with the first MP may be further based on the second set of parameters. In an embodiment, the determination of the first revenue share associated with the first MP may be further based on the application of the AI system 146 (for example, the AI Model 812D) on at least one of the determined second summary record or the second set of parameters. The determination of the first revenue share associated with the first MP is described further, for example, in FIGS. 2 and 5.

At 916, the determined first revenue share associated with the first MP may be transmitted to the first MaaS node 118A. In an embodiment, the processor 808A of the central MaaS node 136 may be configured to transmit the determined first revenue share associated with the first MP to the first MaaS node 118A. The processor 804A of the first MaaS node 118A may receive the determined first revenue share from the central MaaS node 136. In some embodiments, the central MaaS node 136 may also transmit the first revenue share to the first MP node 116A. In an embodiment, the processor 804A of the first MaaS node 118A may be configured to store the received first revenue share associated with the first MP. In an embodiment, the processor 804A of the first MaaS node 118A may transmit the first revenue share associated with the first MP to the first MP node 116A. The processor 802A of the first MP node 116A may verify the first revenue share based on a plurality of transaction records stored on the first MP node 116A. The verification and storage of the first revenue share is described further, for example, in FIG. 3.

Although the flowchart 900 is illustrated as discrete operations, such as 904, 906, 908, 910, 912, 914, and 916, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 10:
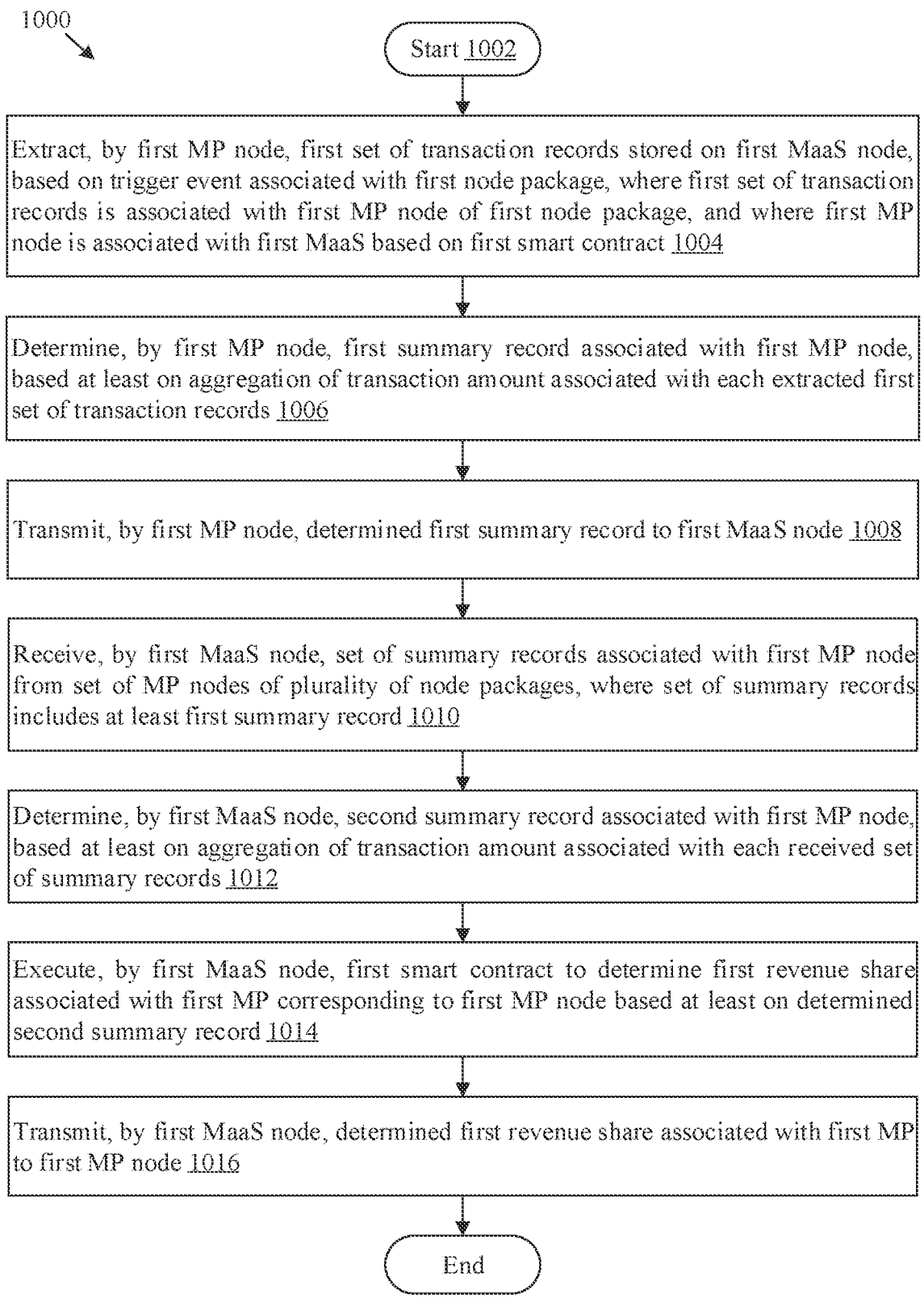
FIG. 10 illustrates an exemplary flowchart of a method for revenue share determination for small-scale or medium-scale transactions on a Mobility-as-a-Service (MaaS) platform with a common database architecture, in accordance with an embodiment of the disclosure.

FIG. 10 illustrates an exemplary flowchart of a method for revenue share determination for small-scale or medium-scale transactions on a Mobility-as-a-Service (MaaS) platform with a common database architecture, in accordance with an embodiment of the disclosure. FIG. 10 is described in conjunction with elements from FIGS. 1, 2, 3, 4, 5, 6, 7, 8, and 9. With reference to FIG. 10, there is shown a flowchart 1000. The exemplary method of the flowchart 1000 may be executed by any computing system, for example, by the first MaaS node 118A or other Maas node of FIG. 1, and/or the first MP node 116A or other MP nodes of FIG. 1. The exemplary method of the flowchart 1000 may start at 1002 and proceed to 1004.

At 1004, the first set of transaction records associated with the first MP node 116A of the first node package 120A, which may be stored on the first MaaS node 118A, may be extracted from the first MaaS node 118A, based on a trigger event associated with the first node package 120A. Each of the first set of transaction records may be associated with a transaction message received by the first subscriber node 114A of the first node package 120A. In an embodiment, prior to the reception of the first set of transaction records, the first MP node 116A may be on-boarded to the first node package 120A of the first MaaS network 102 and/or the system 126. Based on the on-boarding of the first MP node 116A to the first node package 120A, the first MP node 116A may be added to the first node package 120A and the first smart contract may be created between first MP and the first MaaS player. In other words, the first MP node 116A of the first node package 120A may be associated with the first MaaS node 118A based on the first smart contract. The on-boarding of the first MP node 116A is described further, for example, in FIG. 2 or FIG. 4. An ER diagram for the on-boarding of an MP node and revenue calculation for a mobility player associated with the MP node is described further, for example, in FIG. 6. A sequence operation for the on-boarding process for an MP node is described further, for example, in FIG. 7.

In an embodiment, the processor 802A of the first MP node 116A may be configured to extract the first set of transaction records associated with the first MP node 116A from the first MaaS node 118A, based on the trigger event associated with the first node package 120A. The extraction of the first set of transaction records is described further, for example, in FIG. 4.

At 1006, the first summary record associated with the first MP node 116A may be determined based at least on an aggregation of a transaction amount associated with each of the received first set of transactions. In an embodiment, the processor 802A of the first MP node 116A may be configured to determine the first summary record associated with the first MP node 116A, based at least on an aggregation of a transaction amount associated with each of the received first set of transaction records. The determination of the first summary record associated with the first MP node 116A is described further, for example, in FIGS. 4 and 5. In another embodiment, the first MP node 116A may be configured to transmit the extracted first set of transaction records to the first MaaS node 118A. The first MaaS node 118A may be configured to determine the first summary record associated with the first MP node 116A based on at least one of an aggregation of a transaction amount associated with each of the received first set of transaction records. For example, in case the number of transaction records are less than a certain value (such as, a few hundred), the first MP node 116A may transmit the transaction records to the first MaaS node 118A and the first MaaS node 118A may determine the first summary record.

At 1008, the determined first summary record may be transmitted to the first MaaS node 118A. In an embodiment, the processor 802A of the first MP node 116A may be configured to transmit the determined first summary record associated with the first MP node 116A to the first MaaS node 118A. The processor 804A of the first MaaS node 118A may be configured to receive the first summary record from the first MP node 116A.

At 1010, the set of summary records associated with the first MP node 116A may be received from the set of MP nodes of the plurality of nodes packages 120. The set of summary records may at least include the first summary record received from the first aggregator node 134A. In an embodiment, the processor 804A of the first MaaS node 118A may be configured to receive the set of summary records associated with the first MP node 116A from the set of MP nodes.

At 1012, the second summary record associated with the first MP node 116A may be determined based at least on an aggregation of a transaction amount associated with each of the received set of summary records. In an embodiment, the processor 804A of the first MaaS node 118A may be configured to determine the second summary record associated with the first MP node 116A based on an aggregation of a transaction amount associated with each of the received set of summary records. The determination of the second summary record associated with the first MP node 116A is described further, for example, in FIGS. 4 and 5.

At 1014, the first smart contract between the first MP and the first MaaS player may be executed to determine the first revenue share associated with the first MP corresponding to the first MP node 116A based on the determined second summary record. In an embodiment, the processor 804A of the first MaaS node 118A may be configured to execute the first smart contract to determine the first revenue share associated with the first MP corresponding to the first MP node 116A based on the determined second summary record. For example, the first smart contract may include a revenue calculation logic associated with the terms and conditions and service agreement between the first MP and first MaaS provider. Upon execution of the first smart contract for the determination of the first revenue share, the revenue calculation logic may be applied on the second summary record. The second summary record may include a total transaction amount of each transaction corresponding to the plurality of transactions records associated with the first MP node 116A.

The total transaction amount may be used as an indicator of a revenue or royalty earned by the first MP to provide services to the customers through the first MaaS network 102 during a certain time frame or accounting period. In an embodiment, the determination of the first revenue share associated with the first MP may be further based on the second set of parameters. Details related to the second set of parameters are provided, for example, in FIG. 2. In an embodiment, the determination of the first revenue share associated with the first MP may be further based on an application of the AI system 146 (for example, the AI Model 812D) on at least one of the determined second summary record or the second set of parameters. The determination of the first revenue share associated with the first MP is described further, for example, in FIG. 4.

At 1016, the determined first revenue share associated with the first MP may be transmitted to the first MP node 116A. In an embodiment, the processor 804A of the first MaaS node 118A may be configured to transmit the determined first revenue share associated with the first MP to the first MaaS node 118A. The processor 802A of the first MP node 116A may receive the determined first revenue share from the first MaaS node 118A.

In an embodiment, the processor 804A of the first MaaS node 118A may be configured to store the received first revenue share associated with the first MP. In an embodiment, the processor 802A of the first MP node 116A may verify the first revenue share based on a plurality of transaction records stored on the first MP node 116A. The verification and storage of the first revenue share is described further, for example, in FIG. 3 (operations 304 to 320).

Although the flowchart 1000 is illustrated as discrete operations, such as 1004, 1006, 1008, 1010, 1012, 1014, and 1016, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, computer-executable instructions or instructions executable by a machine and/or a computer (for examples, a system, such as the system 126). The system 126 may include a plurality of aggregator nodes (such as, the plurality of aggregator nodes 134) and a central Mobility-as-a-Service (MaaS) node (such as, the central MaaS node 136). The plurality of aggregator nodes 134 and the central MaaS node 136 may be communicatively coupled to a plurality of node packages (such as, the plurality of node packages 120) of a first MaaS network (such as, the first MaaS network 102). Each node package of the plurality of node packages 120 may include a subscriber node of the first MaaS network 102, a Mobility Provider (MP) node of a first distributed ledger, and a MaaS node of a second distributed ledger. The computer-executable instructions or instructions may be executable by a first aggregator node (such as, the first aggregator node 134A) of the plurality of aggregator nodes 134 to perform a first set of operations. The first set of operations may include a reception of a first set of transaction records from a first MaaS node (such as, the first MaaS node 118A) of a first node package (such as, the first node package 120A) of the plurality of node packages, based on a trigger event associated with the first node package 120A. The first set of transaction records may be associated with a first MP node (such as, the first MP node 116A) of the first node package 120A. Each of the first set of transaction records may be associated with a transaction message received by a first subscriber node (such as, the first subscriber node 114A) of the first node package 120A. The first set of operations may further include a determination of a first summary record associated with the first MP node 116A, based at least on an aggregation of a transaction amount associated with each of the received first set of transaction records. The first set of operations may further include a transmission of the determined first summary record to the central MaaS node 136. The computer-executable instructions or instructions may be executable by the central MaaS node 136 to perform a second set of operations. The second set of operation may include a reception of a set of summary records associated with the first MP node 116A from the plurality of aggregator nodes 134. The set of summary records may include at least the first summary record. The second set of operations may further include a determination of a second summary record associated with the first MP node 116A, based at least on an aggregation of a transaction amount associated with each of the received set of summary records. The second set of operations may further include a determination of a first revenue share associated with a first MP corresponding to the first MP node 116A based on the determined second summary record. The second set of operations may further include a transmission of the determined first revenue share associated with the first MP to the first MaaS node 118A.

Various embodiments of the disclosure may provide a non-transitory computer readable medium and/or storage medium having stored thereon, computer-executable instructions or instructions executable by a machine and/or a computer (for example, a system). The system may include a plurality of node packages (such as, the plurality of node packages 120) of a first Mobility-as-a-Service (MaaS) network (such as, the first MaaS network 102). Each node package of the plurality of node packages 120 may include a subscriber node of the first MaaS network 102, a Mobility Provider (MP) node of a first distributed ledger, and a MaaS node of a second distributed ledger. A first MP node (such as, the first MP node 116A) of a first node package (such as, the first node package 120A) of the plurality of node packages 120 may be associated with a first MaaS node (such as, the first MaaS node 118A) of the first node package 120A based on a first smart contract. The computer-executable instructions or instructions may be executable by the first MP node 116A to perform a third set of operations. The third set of operations may include an extraction of a first set of transaction records from the first MaaS node 118A, based on a trigger event associated with the first node package 120A. The first set of transaction records may be associated with the first MP node 116A. Each of the first set of transaction records may be associated with a transaction message received by a first subscriber node (such as, the first subscriber node 114A) of the first node package 120A. The third set of operations may further include a determination of a first summary record associated with the first MP node 116A, based at least on an aggregation of a transaction amount associated with each of the received first set of transaction records. The third set of operations may further include a transmission of the determined first summary record to the first MaaS node 118A. The computer-executable instructions or instructions may be executable by the first MaaS node 118A to perform a fourth set of operations. The fourth set of operation may include a reception of a set of summary records associated with the first MP node 116A from a set of MP nodes of the plurality of node packages 120. The set of summary records may include at least the first summary record. The fourth set of operations may further include a determination of a second summary record associated with the first MP node 116A, based at least on an aggregation of a transaction amount associated with each of the received set of summary records. The fourth set of operations may further include an execution of the first smart contract to determine a first revenue share associated with a first MP corresponding to the first MP node 116A based on the determined second summary record. The fourth set of operations may further include a transmission of the determined first revenue share associated with the first MP to the first MP node 116A.

Exemplary aspects of the disclosure may include a system (such as the system 126). The system 126 may include a plurality of aggregator nodes (such as, the plurality of aggregator nodes 134) and a central Mobility-as-a-Service (MaaS) node (such as, the central MaaS node 136). The plurality of aggregator nodes 134 and the central MaaS node 136 may be communicatively coupled to a plurality of node packages (such as, the plurality of node packages 120) of a first MaaS network (such as, the first MaaS network 102). Each node package of the plurality of node packages 120 may include a subscriber node of the first MaaS network 102, a Mobility Provider (MP) node of a first distributed ledger, and a MaaS node of a second distributed ledger. A first aggregator node (such as, the first aggregator node 134A) of the plurality of aggregator nodes 134 may be configured to receive a first set of transaction records from a first MaaS node (such as, the first MaaS node 118A) of a first node package (such as, the first node package 120A) of the plurality of node packages, based on a trigger event associated with the first node package 120A. The first set of transaction records may be associated with a first MP node (such as, the first MP node 116A) of the first node package 120A. Each of the first set of transaction records may be associated with a transaction message received by a first subscriber node (such as, the first subscriber node 114A) of the first node package 120A. The first aggregator node 134A may be further configured to determine a first summary record associated with the first MP node 116A, based at least on an aggregation of a transaction amount associated with each of the received first set of transaction records. The first aggregator node 134A may be further configured to transmit the determined first summary record to the central MaaS node 136. The central MaaS node 136 may be configured to receive a set of summary records associated with the first MP node 116A from the plurality of aggregator nodes 134. The set of summary records may include at least the first summary record. The central MaaS node 136 may be further configured to determine a second summary record associated with the first MP node 116A, based at least on an aggregation of a transaction amount associated with each of the received set of summary records. The central MaaS node 136 may be further configured to determine a first revenue share associated with a first MP corresponding to the first MP node 116A based on the determined second summary record. The central MaaS node 136 may be further configured to transmit the determined first revenue share associated with the first MP to the first MaaS node 118A.

Exemplary aspects of the disclosure may include a system that may include a plurality of node packages (such as, the plurality of node packages 120) of a first Mobility-as-a-Service (MaaS) network (such as, the first MaaS network 102). Each node package of the plurality of node packages 120 may include a subscriber node of the first MaaS network 102, a Mobility Provider (MP) node of a first distributed ledger, and a MaaS node of a second distributed ledger. A first MP node (such as, the first MP node 116A) of a first node package (such as, the first node package 120A) of the plurality of node packages 120 may be associated with a first MaaS node (such as, the first MaaS node 118A) of the first node package 120A based on a first smart contract. The first MP node 116A may be configured to extract a first set of transaction records from the first MaaS node 118A, based on a trigger event associated with the first node package 120A. The first set of transaction records may be associated with the first MP node 116A. Each of the first set of transaction records may be associated with a transaction message received by a first subscriber node (such as, the first subscriber node 114A) of the first node package 120A. The first MP node 116A may be further configured to determine a first summary record associated with the first MP node 116A, based at least on an aggregation of a transaction amount associated with each of the received first set of transaction records. The first MP node 116A may be further configured to transmit the determined first summary record to the first MaaS node 118A. The first MaaS node 118A may be configured to receive a set of summary records associated with the first MP node 116A from a set of MP nodes of the plurality of node packages 120. The set of summary records may include at least the first summary record. The first MaaS node 118A may be further configured to determine a second summary record associated with the first MP node 116A, based at least on an aggregation of a transaction amount associated with each of the received set of summary records. The first MaaS node 118A may be further configured to execute the first smart contract to determine a first revenue share associated with a first MP corresponding to the first MP node 116A based on the determined second summary record. The first MaaS node 118A may be further configured to transmit the determined first revenue share associated with the first MP to the first MP node 116A.

In an embodiment, the first MaaS network 102 may further include a scheduler node (such as, the scheduler node 144) communicatively coupled to the plurality of node packages 120. In an embodiment, the trigger event associated with the first node package 120A may be generated by the scheduler node 144, based on at least one of a predetermined schedule or a reception of a pre-defined number of transaction records at the first MaaS node 118A. In an embodiment, each of the first MP node 116A and the first MaaS node 118A may be a Blockchain distributed database node. In an embodiment, the first MP corresponding to the first MP node 116A and a first MaaS player corresponding to the first MaaS node 118A may be associated with the first MaaS network 102 based on at least one of a service agreement, a revenue sharing model, a data ownership agreement, a terms of service agreement, a privacy policy, or a policy amendment associated with a region of operation of at least one of the first MP or the first MaaS player.

In an embodiment, the first MP node 116A may be on-boarded to the first node package 120A and the first MP may be associated with the first MaaS player based on the on-boarding. To onboard the first MP node 116A, the first MaaS node 118A may be configured to define a service structure including configuration data associated with the first MP. The first MaaS node 118A may be further configured to transmit an invitation message to the first MP node 116A based on the definition of the service structure. The first MaaS node 118A may be configured to transmit at least one of the service agreement, the terms of service, and the privacy policy to the first MP node 116A based on the transmission of the invitation message. Further, the first MaaS node 118A may be configured to receive a sign-off confirmation message from the first MP node. The sign-off confirmation message may be indicative of a sign-off of the first MP node to the service agreement and the privacy policy.

In an embodiment, the determination of the first summary record associated with the first MP node 116A may further based on a first set of parameters. The first set of parameters may include company information associated with the first MP, service item information associated with each of the first set of transaction records, ticket sales data associated with each of the first set of transaction records, fare price master data associated with the first MP, service price master data associated with the first MP, and/or ticket transaction data associated with each of the first set of transaction records. In an embodiment, the determination of the first summary record may be further based on an application of at least one of a Big Data platform, a Hadoop platform, or a MapReduce platform on at least one of the transaction amount associated with each of the received first set of transaction records or the first set of parameters.

In an embodiment, the determination of the first revenue share associated with the first MP may be further based on a second set of parameters. The second set of parameters may include a fee associated with a first MaaS player corresponding to the first MaaS node, a carbon footprint associated with the first MP, a green energy incentive earned by the first MP, a traffic jam mitigation achieved by the first MP, and/or a fare slab related to rides associated with the first MP. In an embodiment, the determination of the first revenue share associated with the first MP may be further based on an application of an Artificial Intelligence (AI) system (such as, the AI system 146) on at least one of the determined second summary record or the second set of parameters.

In an embodiment, the first MaaS node 118A may receive the first revenue share associated with the first MP from the central MaaS node 136 and may transmit the received first revenue share to the first MP node 116A. In an embodiment, the first MP node 116A may receive the first revenue share associated with the first MP from the first MaaS node 118A and may verify the received first revenue share based on a plurality of transaction records stored on the first MP node 116A. The plurality of transaction records may include at least the first set of transaction records. The first MP node 116A may transmit, to the first MaaS node 118A, first verification information indicative of a result of the verification of the received first revenue share at the first MP node 116A. In an embodiment, the first MaaS node 118A may receive the first verification information from the first MP node 116A. Based on the first set of transaction records stored on the first MaaS node 118A, the first MaaS node 118A may verify the first revenue share to determine second verification information indicative of a result of the verification of the first revenue at the first MaaS node 118A. The first MaaS node 118A may compare the received first verification information with the determined second verification information and may store the first revenue share associated with the first MP on the first MaaS node 118A, based on the comparison.

In an embodiment, the first MaaS node 118A may determine a first adjustment amount associated with the received first revenue share, based on the comparison. The first MaaS node 118A may update the first revenue share associated with the first MP based on the determined first adjustment amount. The first MaaS node 118A may transmit the updated first revenue share to the first MP node 116A and may store the updated first revenue share on the first MaaS node 118A. In an embodiment, the first MaaS node 118A may receive the first revenue share associated with the first MP from the central MaaS node 136 and may store the received first revenue share on the first MaaS node 118A.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
   a plurality of aggregator nodes; and
   a central Mobility-as-a-Service (MaaS) node, wherein the plurality of aggregator nodes and the central MaaS node are communicatively coupled to a plurality of node packages of a first MaaS network, wherein each node package of the plurality of node packages includes a subscriber node of the first MaaS network, a Mobility Provider (MP) node of a first distributed ledger, and a MaaS node of a second distributed ledger, and wherein a first aggregator node of the plurality of aggregator nodes is configured to:
      receive a first set of transaction records from a first MaaS node of a first node package of the plurality of node packages, based on a trigger event associated with the first node package, wherein
         the first set of transaction records is associated with a first MP node of the first node package, and
         each of the first set of transaction records is associated with a transaction message received by a first subscriber node of the first node package;
      determine a first summary record associated with the first MP node, based at least on an aggregation of a transaction amount associated with each of the received first set of transaction records; and
      transmit the determined first summary record to the central MaaS node, wherein the central MaaS node is configured to:
         receive a set of summary records associated with the first MP node from the plurality of aggregator nodes, wherein the set of summary records includes at least the first summary record;
         determine a second summary record associated with the first MP node, based at least on an aggregation of a transaction amount associated with each of the received set of summary records;
         determine a first revenue share associated with a first MP corresponding to the first MP node based on the determined second summary record; and
         transmit the determined first revenue share associated with the first MP to the first MaaS node.

2. The system according to claim 1, wherein the first MaaS network further includes a scheduler node communicatively coupled to the plurality of node packages.

3. The system according to claim 2, wherein the trigger event associated with the first node package is generated by the scheduler node, based on at least one of a pre-determined schedule or a reception of a pre-defined number of transaction records at the first MaaS node.

4. The system according to claim 1, wherein each of the first MP node and the first MaaS node is a Blockchain distributed database node.

5. The system according to claim 1, wherein the first MP corresponding to the first MP node and a first MaaS player corresponding to the first MaaS node are associated with the first MaaS network based on at least one of a service agreement, a revenue sharing model, a data ownership agreement, a terms of service agreement, a privacy policy, or a policy amendment associated with a region of operation of at least one of the first MP or the first MaaS player.

6. The system according to claim 5, wherein the first MP node is on-boarded to the first node package and the first MP is associated with the first MaaS player based on the on-boarding, and wherein to onboard the first MP node, the first MaaS node is configured to:
   define a service structure including configuration data associated with the first MP;
   transmit an invitation message to the first MP node based on the definition of the service structure;
   transmit at least one of the service agreement, the terms of service, and the privacy policy to the first MP node based on the transmission of the invitation message; and
   receive a sign-off confirmation message from the first MP node, where the sign-off confirmation message is indicative of a sign-off of the first MP node to the service agreement and the privacy policy.

7. The system according to claim 1, wherein the determination of the first summary record associated with the first MP node is further based on a first set of parameters including at least one of:
   company information associated with the first MP,
   service item information associated with each of the first set of transaction records,
   ticket sales data associated with each of the first set of transaction records,
   fare price master data associated with the first MP,
   service price master data associated with the first MP, or
   ticket transaction data associated with each of the first set of transaction records.

8. The system according to claim 7, wherein the determination of the first summary record is further based on an application of at least one of a Big Data platform, a Hadoop platform, or a MapReduce platform on at least one of the transaction amount associated with each of the received first set of transaction records or the first set of parameters.

9. The system according to claim 1, wherein the determination of the first revenue share associated with the first MP is further based on a second set of parameters including at least one of:
   a fee associated with a first MaaS player corresponding to the first MaaS node,
   a carbon footprint associated with the first MP,
   a green energy incentive earned by the first MP,
   a traffic jam mitigation achieved by the first MP, or
   a fare slab related to rides associated with the first MP.

10. The system according to claim 9, wherein the determination of the first revenue share associated with the first MP is further based on an application of an Artificial Intelligence (AI) system on at least one of the determined second summary record or the second set of parameters.

11. The system according to claim 1, wherein the first MaaS node:
   receives the first revenue share associated with the first MP from the central MaaS node; and
   transmits the received first revenue share to the first MP node.

12. The system according to claim 11, wherein the first MP node:
   receives the first revenue share associated with the first MP from the first MaaS node;
   verifies the received first revenue share based on a plurality of transaction records stored on the first MP node, wherein the plurality of transaction records includes at least the first set of transaction records; and
   transmits, to the first MaaS node, first verification information indicative of a result of the verification of the received first revenue share at the first MP node.

13. The system according to claim 12, wherein the first MaaS node:
   receives the first verification information from the first MP node;
   based on the first set of transaction records stored on the first MaaS node, verifies the first revenue share to determine second verification information indicative of a result of the verification of the first revenue at the first MaaS node;
   compares the received first verification information with the determined second verification information; and
   stores the first revenue share associated with the first MP on the first MaaS node, based on the comparison.

14. The system according to claim 13, wherein the first MaaS node:
   determines a first adjustment amount associated with the received first revenue share, based on the comparison;
   updates the first revenue share associated with the first MP based on the determined first adjustment amount;
   transmits the updated first revenue share to the first MP node; and
   stores the updated first revenue share on the first MaaS node.

15. The system according to claim 1, wherein the first MaaS node:
   receives the first revenue share associated with the first MP from the central MaaS node; and
   stores the received first revenue share on the first MaaS node.

16. A system, comprising:
   a plurality of node packages of a first Mobility-as-a-Service (MaaS) network, wherein each node package of the plurality of node packages includes a subscriber node of the first MaaS network, a Mobility Provider (MP) node of a first distributed ledger, and a MaaS node of a second distributed ledger, wherein a first MP node of a first node package of the plurality of node packages is associated with a first MaaS node of the first node package based on a first smart contract, and wherein the first MP node is configured to:
      extract a first set of transaction records stored on the first MaaS node, based on a trigger event associated with the first node package, wherein
         the first set of transaction records is associated with the first MP node, and
         each of the first set of transaction records is associated with a transaction message received by a first subscriber node of the first node package;
      determine a first summary record associated with the first MP node, based at least on an aggregation of a transaction amount associated with each of the extracted first set of transaction records; and
      transmit the determined first summary record to the first MaaS node, wherein the first MaaS node is configured to:
         receive a set of summary records associated with the first MP node from a set of MP nodes of the plurality of node packages, wherein the set of summary records includes at least the first summary record;
         determine a second summary record associated with the first MP node, based at least on an aggregation of a transaction amount associated with each of the received set of summary records;
         execute the first smart contract to determine a first revenue share associated with a first MP corresponding to the first MP node based on the determined second summary record; and
         transmit the determined first revenue share associated with the first MP to the first MP node.

17. The system according to claim 16, wherein the first MP node is further configured to:
   receive the first revenue share associated with the first MP from the first MaaS node;
   verify the received first revenue share based on a plurality of transaction records stored on the first MP node, wherein the plurality of transaction records includes at least the first set of transaction records; and
   transmit, to the first MaaS node, first verification information indicative of a result of the verification of the received first revenue share at the first MP node.

18. The system according to claim 17, wherein the first MaaS node is further configured to:
   receive the first verification information from the first MP node;
   based on the first set of transaction records stored on the first MaaS node, verify the first revenue share to determine second verification information indicative of a result of the verification of the first revenue at the first MaaS node;
   compare the received first verification information with the determined second verification information; and
   store the first revenue share associated with the first MP on the first MaaS node, based on the comparison.

19. The system according to claim 18, wherein the first MaaS node is further configured to:
  determine a first adjustment amount associated with the received first revenue share, based on the comparison;
  update the first revenue share associated with the first MP based on the determined first adjustment amount;
  transmit the updated first revenue share to the first MP node; and
  store the updated first revenue share on the first MaaS node.

20. The system according to claim 16, wherein the first MaaS node is further configured to store the determined first revenue share on the first MaaS node.

21. A method, comprising:
  in a system which comprises a plurality of aggregator nodes and a central Mobility-as-a-Service (MaaS) node communicatively coupled to a plurality of node packages of a first MaaS network, wherein each node package of the plurality of node packages includes a subscriber node of the first MaaS network, a Mobility Provider (MP) node of a first distributed ledger, and a MaaS node of a second distributed ledger:
    receiving, by a first aggregator node of the plurality of aggregator nodes, a first set of transaction records from a first MaaS node of a first node package of the plurality of node packages, based on a trigger event associated with the first node package, wherein
      the first set of transaction records is associated with a first MP node of the first node package, and
      each of the first set of transaction records is associated with a transaction message received by a first subscriber node of the first node package;
    determining, by the first aggregator node, a first summary record associated with the first MP node, based at least on an aggregation of a transaction amount associated with each of the received first set of transaction records;
    transmitting, by the first aggregator node, the determined first summary record to the central MaaS node;
    receiving, by the central MaaS node, a set of summary records associated with the first MP node from the plurality of aggregator nodes, wherein the set of summary records includes at least the first summary record;
    determining, by the central MaaS node, a second summary record associated with the first MP node, based at least on an aggregation of a transaction amount associated with each of the received set of summary records;
    determining, by the central MaaS node, a first revenue share associated with a first MP corresponding to the first MP node based on the determined second summary record; and
    transmitting, by the central MaaS node, the determined first revenue share associated with the first MP to the first MaaS node.

22. A non-transitory computer-readable medium having stored thereon, computer-executable instructions that when executed by a computer in a system which comprises a plurality of aggregator nodes and a central Mobility-as-a-Service (MaaS) node, causes the system to execute operations, the operations comprising:
  receiving, by a first aggregator node of the plurality of aggregator nodes, a first set of transaction records, wherein
    the plurality of aggregator nodes and the central MaaS node are communicatively coupled to a plurality of node packages of a first MaaS network, wherein each node package of the plurality of node packages includes a subscriber node of the first MaaS network, a Mobility Provider (MP) node of a first distributed ledger, and a MaaS node of a second distributed ledger,
    the first set of transaction records are received from a first MaaS node of a first node package of the plurality of node packages, based on a trigger event associated with the first node package,
    the first set of transaction records is associated with a first MP node of the first node package, and
    each of the first set of transaction records is associated with a transaction message received by a first subscriber node of the first node package;
  determining, by the first aggregator node, a first summary record associated with the first MP node, based at least on an aggregation of a transaction amount associated with each of the received first set of transaction records;
  transmitting, by the first aggregator node, the determined first summary record to the central MaaS node;
  receiving, by the central MaaS node, a set of summary records associated with the first MP node from the plurality of aggregator nodes, wherein the set of summary records includes at least the first summary record;
  determining, by the central MaaS node, a second summary record associated with the first MP node, based at least on an aggregation of a transaction amount associated with each of the received set of summary records;
  determining, by the central MaaS node, a first revenue share associated with a first MP corresponding to the first MP node based on the determined second summary record; and
  transmitting, by the central MaaS node, the determined first revenue share associated with the first MP to the first MaaS node.

* * * * *